United States Patent
Kim et al.

(10) Patent No.: US 10,819,380 B2
(45) Date of Patent: Oct. 27, 2020

(54) COVER OF PORTABLE TERMINAL AND ELECTRONIC DEVICE INCLUDING THE SAME

(71) Applicant: Samsung Display Co., Ltd., Yongin-Si, Gyeonggi-Do (KR)

(72) Inventors: Sungchul Kim, Seongnam-si (KR); Jonghyuk Lee, Seoul (KR); Donghwan Shim, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/031,928

(22) Filed: Jul. 10, 2018

(65) Prior Publication Data

US 2019/0074859 A1    Mar. 7, 2019

(30) Foreign Application Priority Data

Sep. 5, 2017   (KR) .................. 10-2017-0113527

(51) Int. Cl.
| | |
|---|---|
| *A45C 11/00* | (2006.01) |
| *H04B 1/3888* | (2015.01) |
| *G06F 1/16* | (2006.01) |
| *H04M 1/02* | (2006.01) |

(52) U.S. Cl.
CPC ............ *H04B 1/3888* (2013.01); *A45C 11/00* (2013.01); *G06F 1/1656* (2013.01); *G06F 1/1684* (2013.01); *H04M 1/0252* (2013.01); *H04M 1/0266* (2013.01); *A45C 2011/002* (2013.01); *G06F 2200/1633* (2013.01)

(58) Field of Classification Search
CPC .............. H04B 1/3888; H04M 1/0252; H04M 1/0266; A45C 11/00; A45C 2011/002; G06F 1/1656; G06F 1/1684; G06F 2200/1633
See application file for complete search history.

(56) References Cited

U.S. PATENT DOCUMENTS

| | | | |
|---|---|---|---|
| 4,901,852 A * | 2/1990 | King ................. | B65D 65/02 206/320 |
| 8,547,695 B2 | 10/2013 | Schroeder | |
| 8,723,824 B2 * | 5/2014 | Myers ............... | G06F 3/0488 345/173 |
| 8,915,360 B2 | 12/2014 | Oliver | |

(Continued)

FOREIGN PATENT DOCUMENTS

| | | |
|---|---|---|
| JP | 2001358814 A | 12/2001 |
| KR | 10-2016-0000110 A | 1/2016 |

(Continued)

OTHER PUBLICATIONS

EPO Office Action Report, Application No. 18190133.1, dated Jun. 29, 2020, 7 pages.

*Primary Examiner* — Nathan S Taylor
(74) *Attorney, Agent, or Firm* — Innovation Counsel LLP

(57) ABSTRACT

Provided is a portable terminal cover. The portable terminal cover includes a plurality of transparent side surfaces configured to cover a plurality of side surface display parts of a portable terminal and a front surface configured to cover a top surface display part of the portable terminal and connected to at least one side surface of the side surfaces and thereby to confirm an image provided on the side surface display parts while protecting the side surface display parts of the portable terminal.

5 Claims, 26 Drawing Sheets

(56) References Cited

U.S. PATENT DOCUMENTS

| | | | |
|---|---|---|---|
| 9,072,351 B2 | 7/2015 | Schroeder | |
| 9,300,347 B1* | 3/2016 | Coverstone | H04B 1/3888 |
| 9,473,192 B2 | 10/2016 | Fathollahi et al. | |
| 9,768,818 B2 | 9/2017 | Wong Chee | |
| 2001/0008074 A1* | 7/2001 | Radley-Smith | A44C 5/0015 |
| | | | 63/3 |
| 2002/0086711 A1* | 7/2002 | Flannery | H04M 1/05 |
| | | | 455/566 |
| 2003/0222833 A1* | 12/2003 | Nakai | G06F 1/1626 |
| | | | 345/1.1 |
| 2004/0264173 A1* | 12/2004 | Vanderschuit | A42B 1/062 |
| | | | 362/103 |
| 2005/0024341 A1* | 2/2005 | Gillespie | G06F 3/0481 |
| | | | 345/173 |
| 2008/0146285 A1* | 6/2008 | Lee | H04M 1/0266 |
| | | | 455/566 |
| 2008/0214252 A1 | 9/2008 | Oten et al. | |
| 2012/0052929 A1* | 3/2012 | Thammasouk | G06F 1/1626 |
| | | | 455/575.1 |
| 2013/0076612 A1* | 3/2013 | Myers | G06F 1/1652 |
| | | | 345/156 |
| 2013/0281169 A1* | 10/2013 | Coverstone | H04M 1/0283 |
| | | | 455/575.8 |
| 2014/0162729 A1* | 6/2014 | Garden | H04B 1/3888 |
| | | | 455/566 |
| 2014/0291173 A1 | 10/2014 | Kokubo et al. | |
| 2015/0156143 A1 | 6/2015 | Chopde et al. | |
| 2015/0185760 A1 | 7/2015 | Schroeder | |
| 2015/0311937 A1 | 10/2015 | Lee | |
| 2015/0378592 A1 | 12/2015 | Kim | |
| 2016/0062391 A1* | 3/2016 | Choi | G06F 1/1652 |
| | | | 361/679.03 |
| 2016/0065262 A1* | 3/2016 | Wilson | G06F 1/1633 |
| | | | 455/575.8 |
| 2016/0095241 A1* | 3/2016 | Probst | H04B 1/3838 |
| | | | 428/137 |
| 2016/0254835 A1* | 9/2016 | Ashley | H04B 1/3888 |
| | | | 455/575.8 |
| 2016/0269069 A1* | 9/2016 | Fathollahi | H04M 1/0202 |
| 2017/0063423 A1* | 3/2017 | Perle | H04B 1/3888 |
| 2017/0097715 A1* | 4/2017 | Kim | H04M 1/0266 |
| 2017/0230490 A1 | 8/2017 | Ageishi | |
| 2019/0007084 A1* | 1/2019 | Haug | G06F 1/1628 |

FOREIGN PATENT DOCUMENTS

| | | | | |
|---|---|---|---|---|
| KR | 10-1620780 B1 | 5/2016 | | |
| KR | 10-1620781 B1 | 5/2016 | | |
| KR | 10-1624161 B1 | 5/2016 | | |
| WO | WO-2017148740 A1 * | 9/2017 | | G06F 1/1628 |

* cited by examiner

FIG. 6
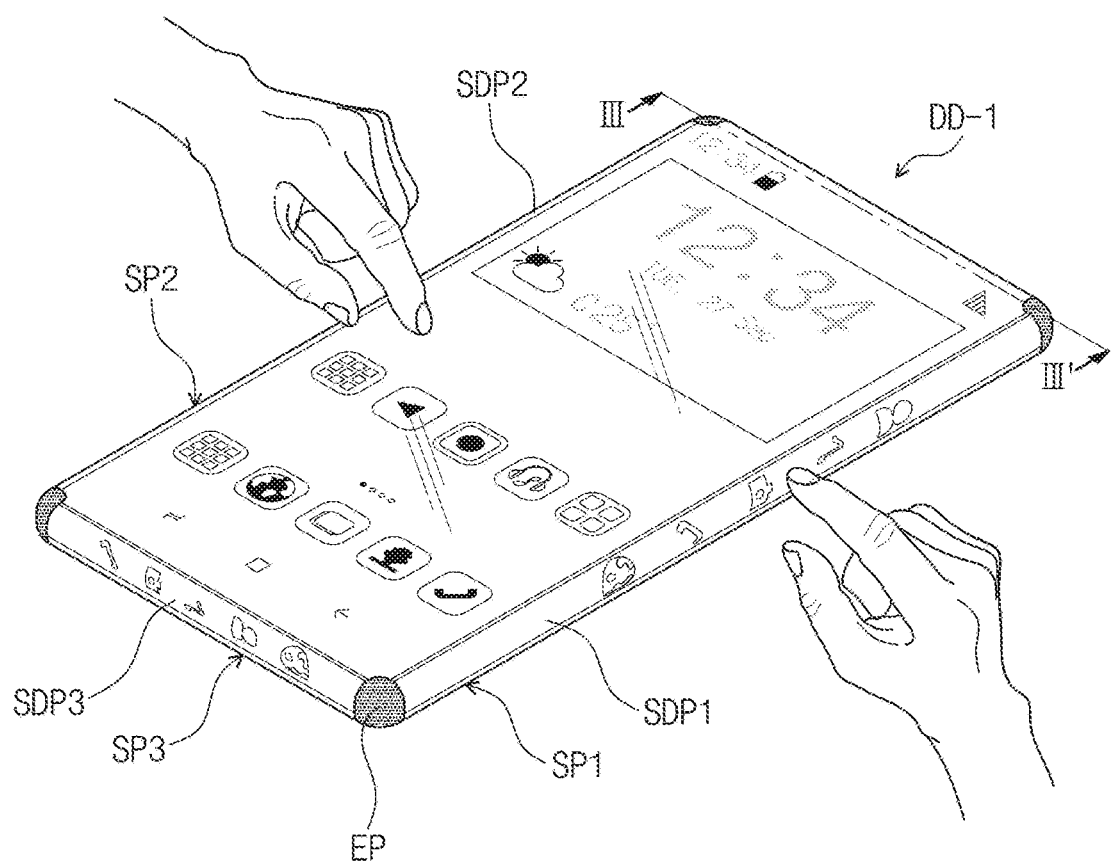
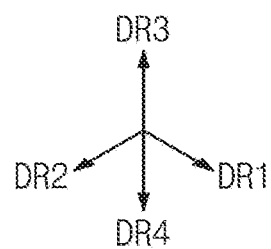

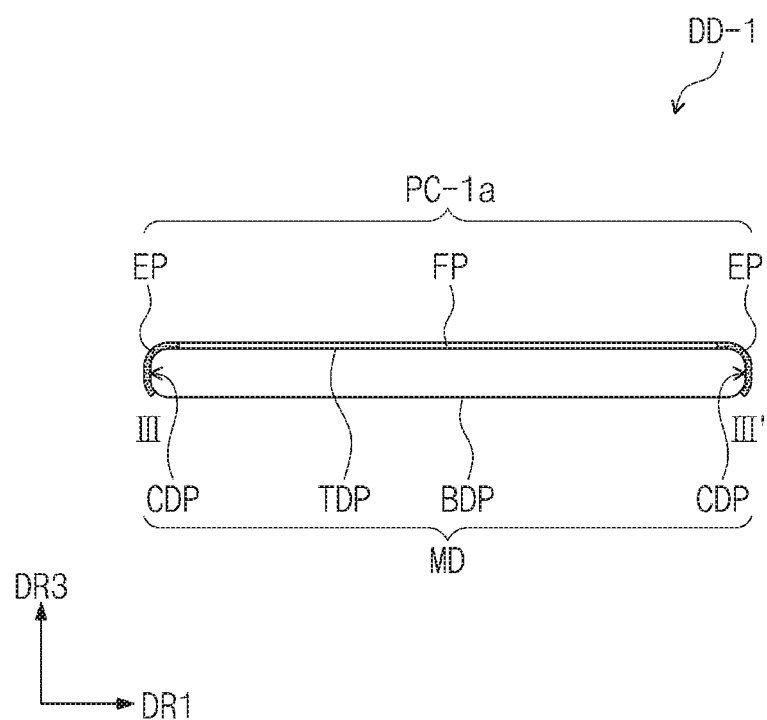

FIG. 18B
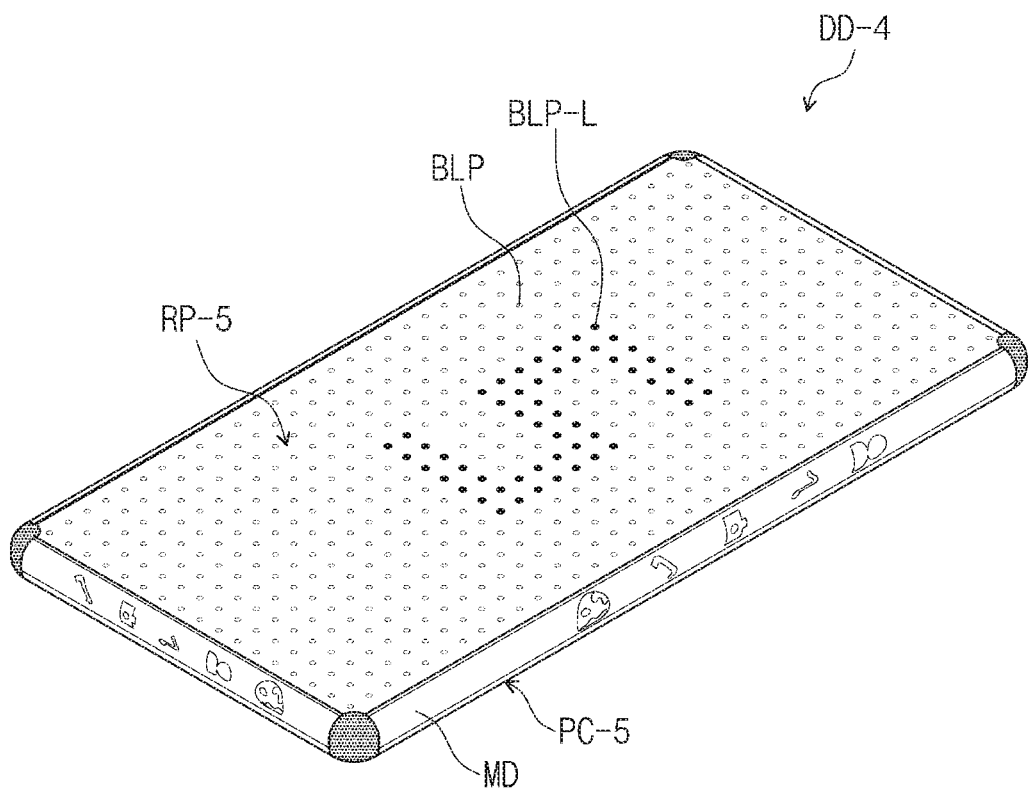
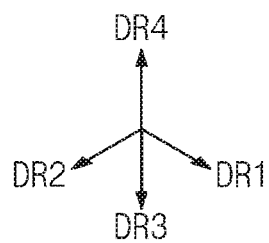

COVER OF PORTABLE TERMINAL AND ELECTRONIC DEVICE INCLUDING THE SAME

CROSS-REFERENCE TO RELATED APPLICATIONS

This U.S. non-provisional patent application claims priority under 35 U.S.C. § 119 of Korean Patent Application No. 10-2017-0113527, filed on Sep. 5, 2017, the entire contents of which are hereby incorporated by reference.

BACKGROUND

The present disclosure herein relates to a cover of a portable terminal and an electronic device including the same, and more particularly, to a protection cover for a portable terminal including a plurality of side surface display parts laterally providing an image and an electronic device including the same.

Various electronic devices are being used to provide image information. In recent years, development of an electronic device having a plurality of display parts that provide an image or a picture in various directions as well as a direction of a top surface is ongoing.

In case of portable electronic devices, a cover is required to protect the electronic device against an external stimulation or impact during use. Particularly, in such an electronic device including a plurality of display parts, which is being developed in recent years, it is necessary to develop a protection cover that is capable of protecting the display parts that are exposed in various directions while providing an image displayed on the plurality of display parts to a user as it is.

SUMMARY

The present disclosure provides a cover of a portable terminal, which protects side surface display parts while transmitting an image, which is displayed on the side surface display parts of the portable terminal including the plurality of side surface display parts, to a user as it is.

The present disclosure also provides an electronic device a portable terminal, which includes a plurality of side surface display parts and a portable terminal cover including transparent side surfaces for covering the side surface display parts and safely protects the portable terminal against external environments while easily transmitting an image displayed on the side surface display parts to a user through the portable terminal cover.

An embodiment of the inventive concept provides a portable terminal cover including: a plurality of transparent side surfaces configured to cover a plurality of side surface display parts of a portable terminal; and a front surface configured to cover a top surface display part of the portable terminal and connected to at least one sides of the side surfaces.

The side surfaces may include four side surfaces configured to cover the side surface display parts, and the four side surfaces may be respectively connected to four side surfaces of the front surface and have a shape integrated with the front surface.

The front surface may be transparent.

The portable terminal cover may further include at least one connection part disposed between the adjacent side surfaces of the four side surfaces.

The side surfaces, the front surface, and the connection part may be integrated with each other.

A bottom surface of the portable terminal may be opened to be exposed and provide an insertion space defined by the four side surfaces and the front surface.

The portable terminal cover may further include: a rear surface facing the front surface; and a cover part connected to one side of the front surface to cover the one side surface of the portable terminal in a first mode and configured to expose the one side surface of the portable terminal in a second mode.

The side surfaces may include three side surfaces configured to cover the side surface display parts, and the three side surfaces may be disposed between the front surface and the rear surface.

An insertion space defined by the front surface, the rear surface, and the three side surfaces may be provided.

The front surface, the rear surface, and the three side surfaces may be integrated with each other and transparent.

The front surface, the rear surface, the three side surfaces, and the cover part may be integrated with each other, and the front surface, the three side surfaces, and the cover part may be transparent, and the rear surface may be opaque.

The portable terminal cover may further include a rear surface configured to cover a bottom surface of the portable terminal and connected to the side surfaces, wherein one side surface of the side surfaces may connect the front surface to the rear surface.

The front surface may cover the top surface display part in a third mode, and the front surface may be opened to expose the top surface display part in a fourth mode.

The side surfaces may include four side surfaces configured to cover the side surface display parts, and the four side surfaces may be respectively connected to four sides of the rear surface to provide an integrated shape.

Each of the four side surfaces may be connected to the rear surface and bent in a direction of the top surface display part.

The portable terminal cover may further include at least one connection part disposed between the adjacent side surfaces of the four side surfaces, wherein the at least one connection part may include a light emitting device.

The at least one connection part may be connected to the rear surface, and the rear surface may include a rear light emitting device.

An insertion space which is defined by the rear surface and the four side surfaces and in which the portable terminal is seated may be provided.

The rear surface may further include a coupling part coupled to the portable terminal.

In an embodiment of the inventive concept, a portable terminal cover includes: a plurality of transparent side surfaces configured to cover sub display surfaces of a portable terminal including a main display surface configured to provide an image in a first direction and the plurality of sub display surfaces configured to provide an image in a direction different from the first direction; and a front surface connected to at least one side surface of the side surfaces to cover the main display surface.

The sub display surfaces may include four sub display surfaces, and the side surfaces may include four side surfaces configured to respectively cover the four sub display surfaces.

In an embodiment of the inventive concept, an electronic device includes: a portable terminal including a top surface display part and at least four side surface display parts extending from the top surface display part; and a portable terminal cover including a plurality of side surfaces configured to cover the side surface display parts and transmit an image provided on the side surface display parts and a front surface connected to at least one side surface of the side surfaces to cover the top surface display part.

A display surface of each of the side surface display parts may not be parallel to a display surface of the top surface display part.

The portable terminal cover may further include at least one connection part disposed between the adjacent side surfaces of the side surfaces, and the connection part may include a light emitting device, and the light emitting device may be controlled by receiving a signal provided from the portable terminal.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 6 is a perspective view of an electronic device according to an embodiment;

FIG. 7 is a partial cross-sectional view taken along line III-III' of FIG. 6;

Figure 16A:
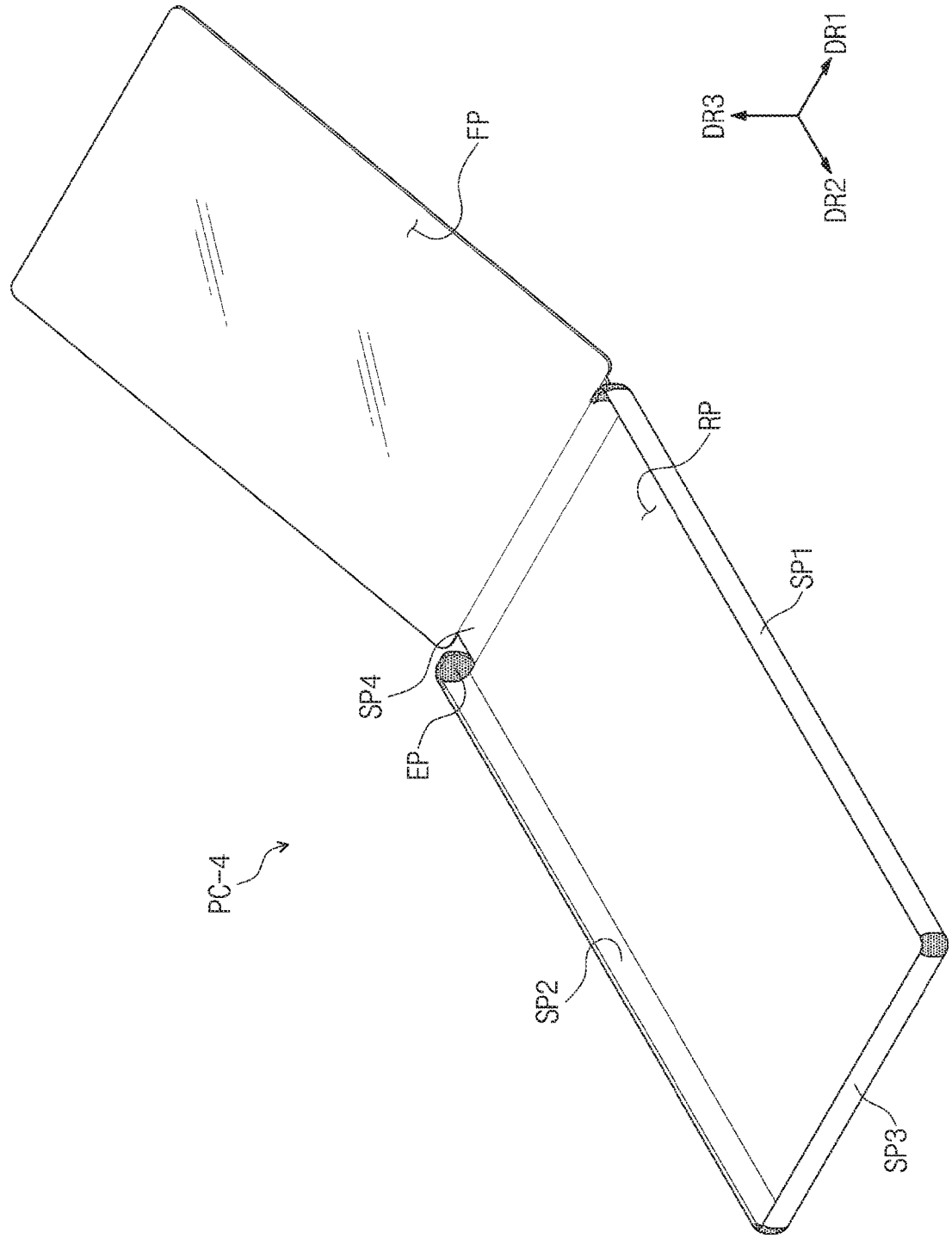
Figure 16B:
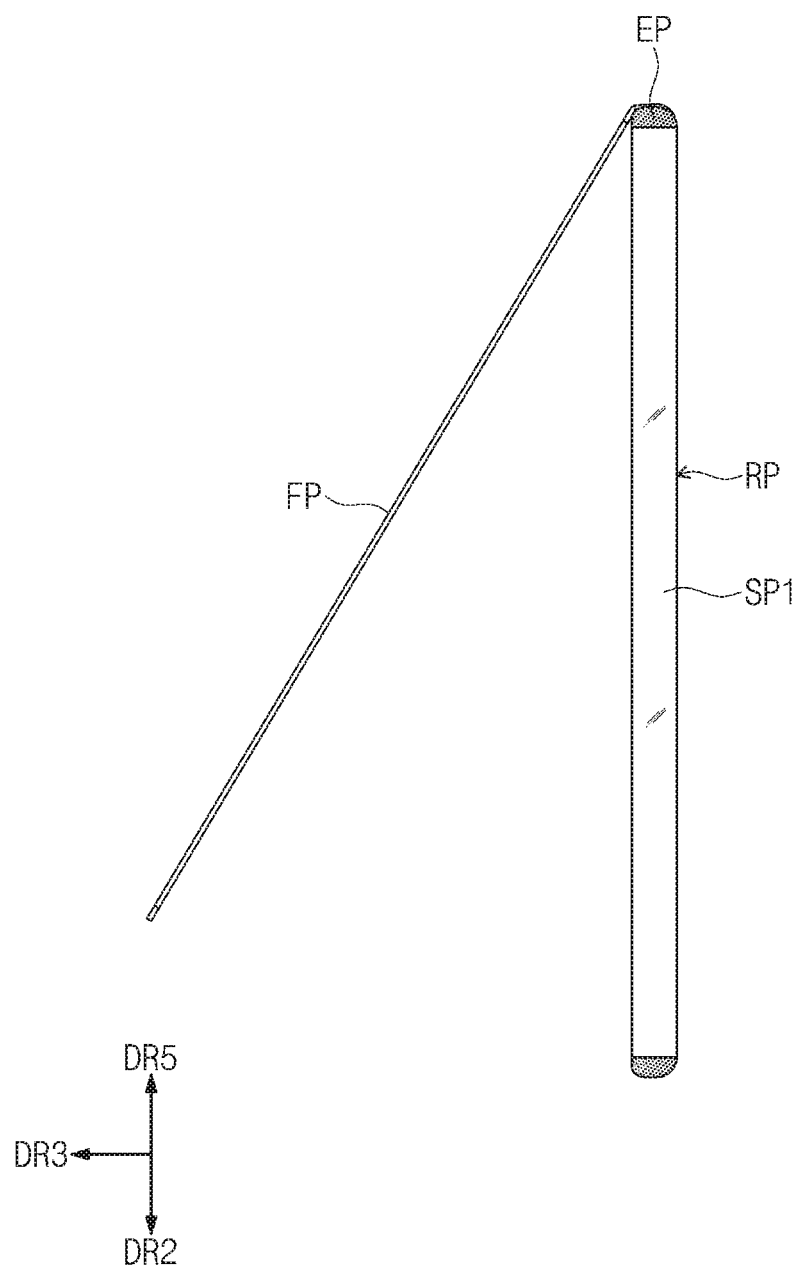
Figure 17:
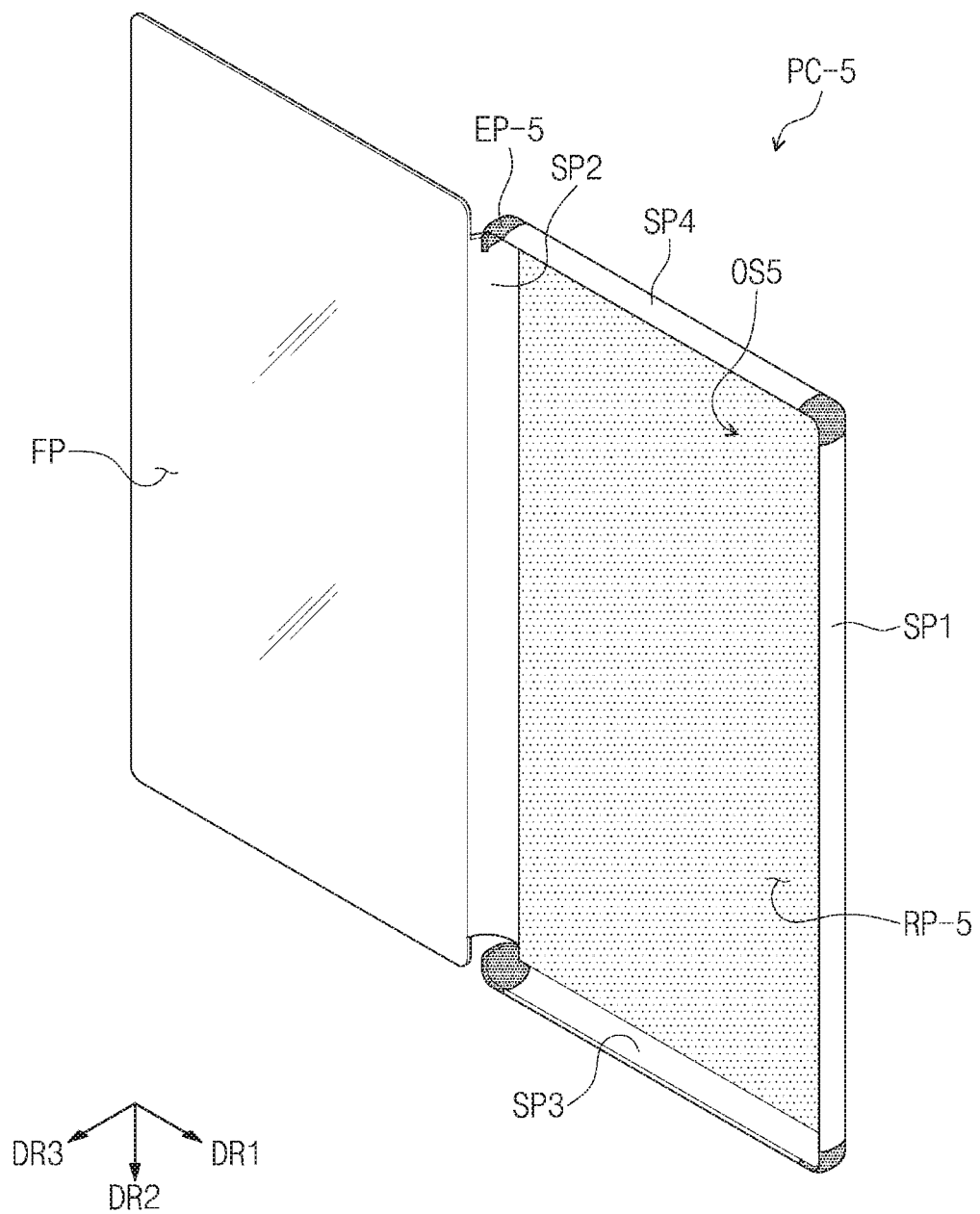
Figure 18A:
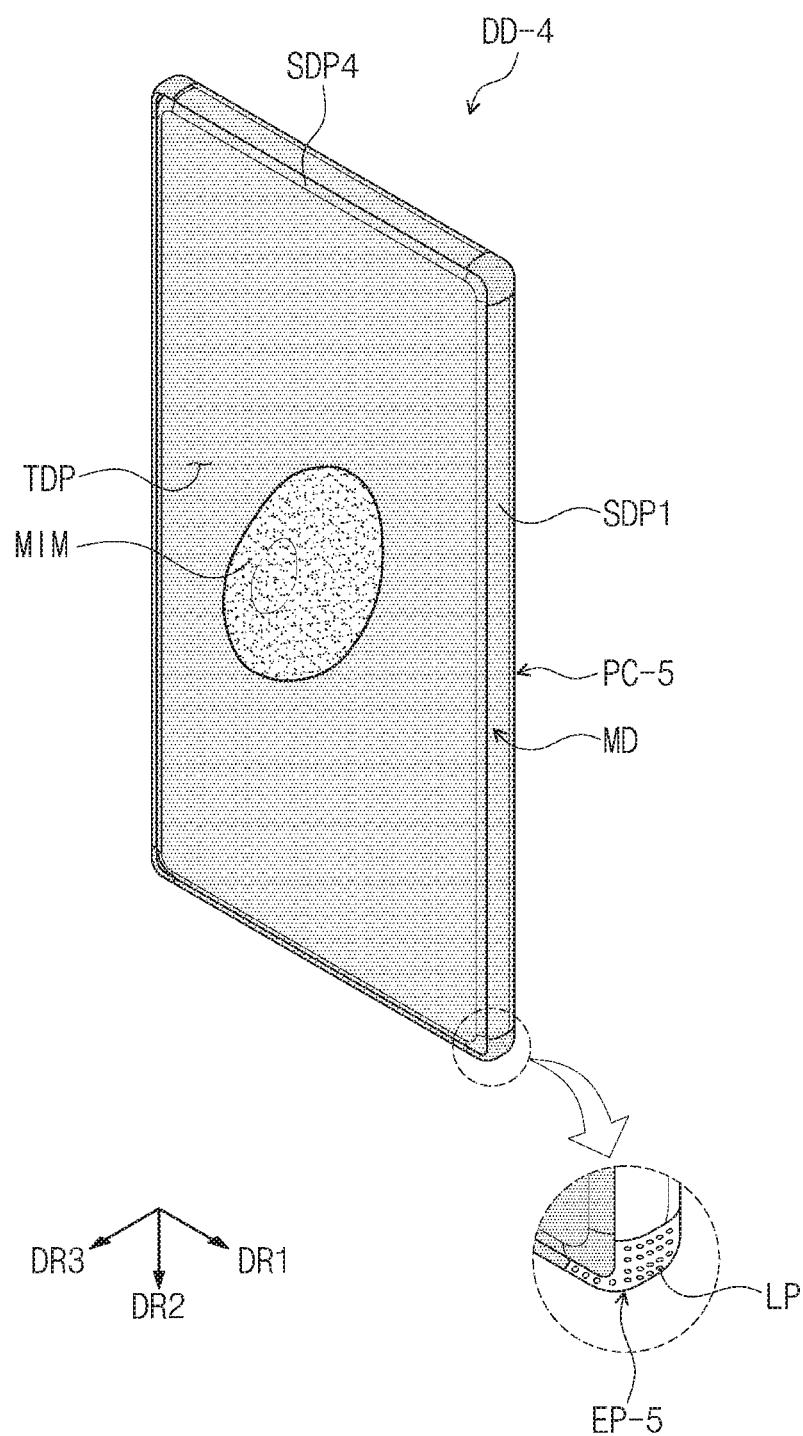

15A and 15B are perspective views of an electronic device according to an embodiment;

FIG. 16A is a perspective view of a portable terminal cover according to an embodiment;

FIG. 16B is a side view of a portable terminal of FIG. 16A according to an embodiment;

FIG. 17 is a perspective view of a portable terminal cover according to an embodiment; and FIGS. 18A and 18B are perspective views of an electronic device including the portable terminal cover of FIG. 17.

DETAILED DESCRIPTION

Since the present disclosure may have diverse modified embodiments, specific embodiments are illustrated in the drawings and are described in the detailed description of the inventive concept. However, this does not limit the present disclosure within specific embodiments and it should be understood that the present disclosure covers all the modifications, equivalents, and replacements within the idea and technical scope of the present disclosure.

Like reference numerals refer to like elements throughout. In the drawings, the dimensions and size of each structure are exaggerated, omitted, or schematically illustrated for convenience in description and clarity. It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

The meaning of 'include' or 'comprise' specifies a property, a region, a fixed number, a step, a process, an element and/or a component but does not exclude other properties, regions, fixed numbers, steps, processes, elements and/or components.

In the specification, it will be understood that when a layer (or film), a region, or a plate is referred to as being 'on' another layer, region, or plate, it can be directly on the other layer, region, or plate, or intervening layers, regions, or plates may also be present. On the contrary to this, it will be understood that when a layer, a film, a region, or a plate is referred to as being 'under' another layer, region, or plate, it can be directly under the other layer (or film), region, or plate, or intervening layers, regions, or plates may also be present. Also, in this specification, a structure in which a layer, a film, a region, or a plate is disposed "on" another layer, film, region, or plate may include a structure in which the layer, film, region, or plate is disposed on a lower portion as well as an upper portion of another layer, film, region, or plate.

Hereinafter, a portable terminal cover and an electronic device according to an embodiment of the inventive concept will be described with reference to the accompanying drawings.

Figure 1:
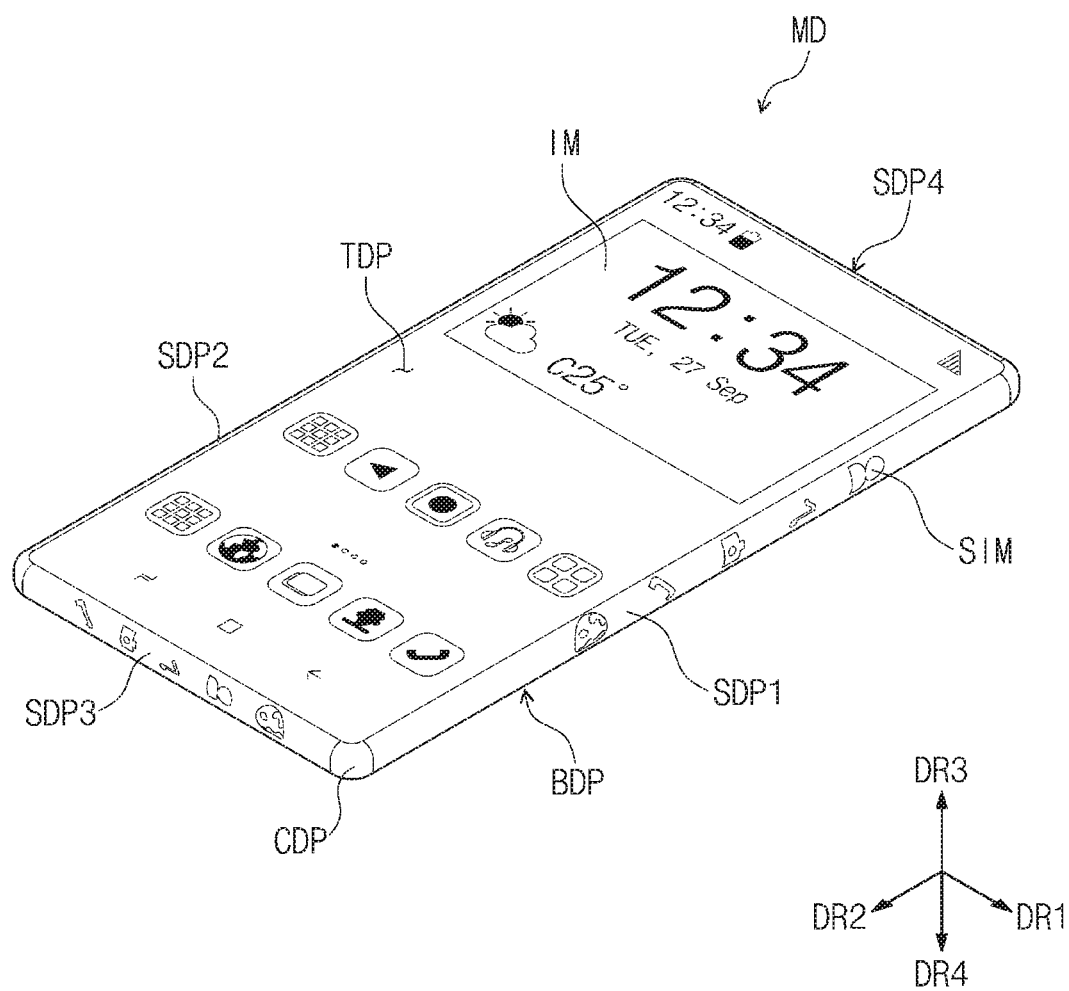
FIG. 1 is a perspective view illustrating an example of a portable terminal provided in an electronic device according to an embodiment.
Figure 2A:
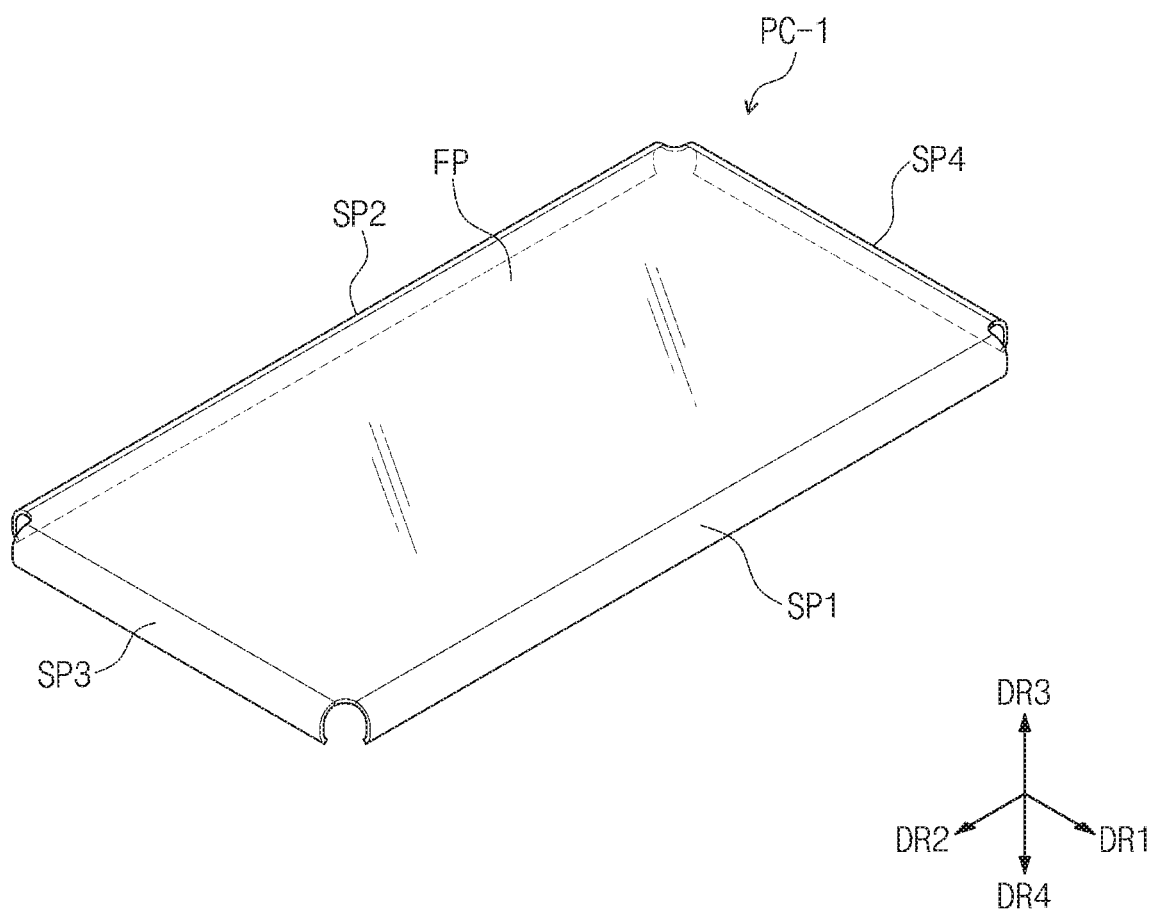
FIGS. 2A and 2B are perspective views of a portable terminal cover according to an embodiment.
Figure 2B:
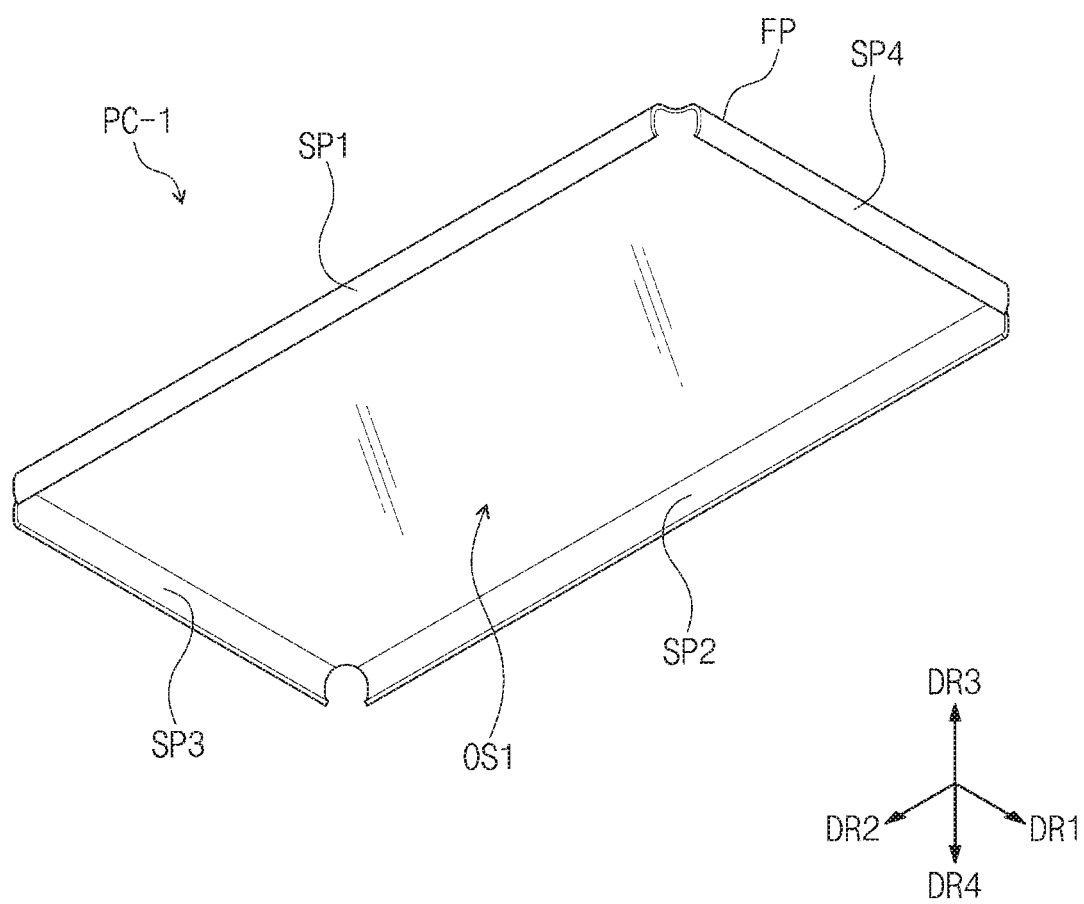
Figure 3A:
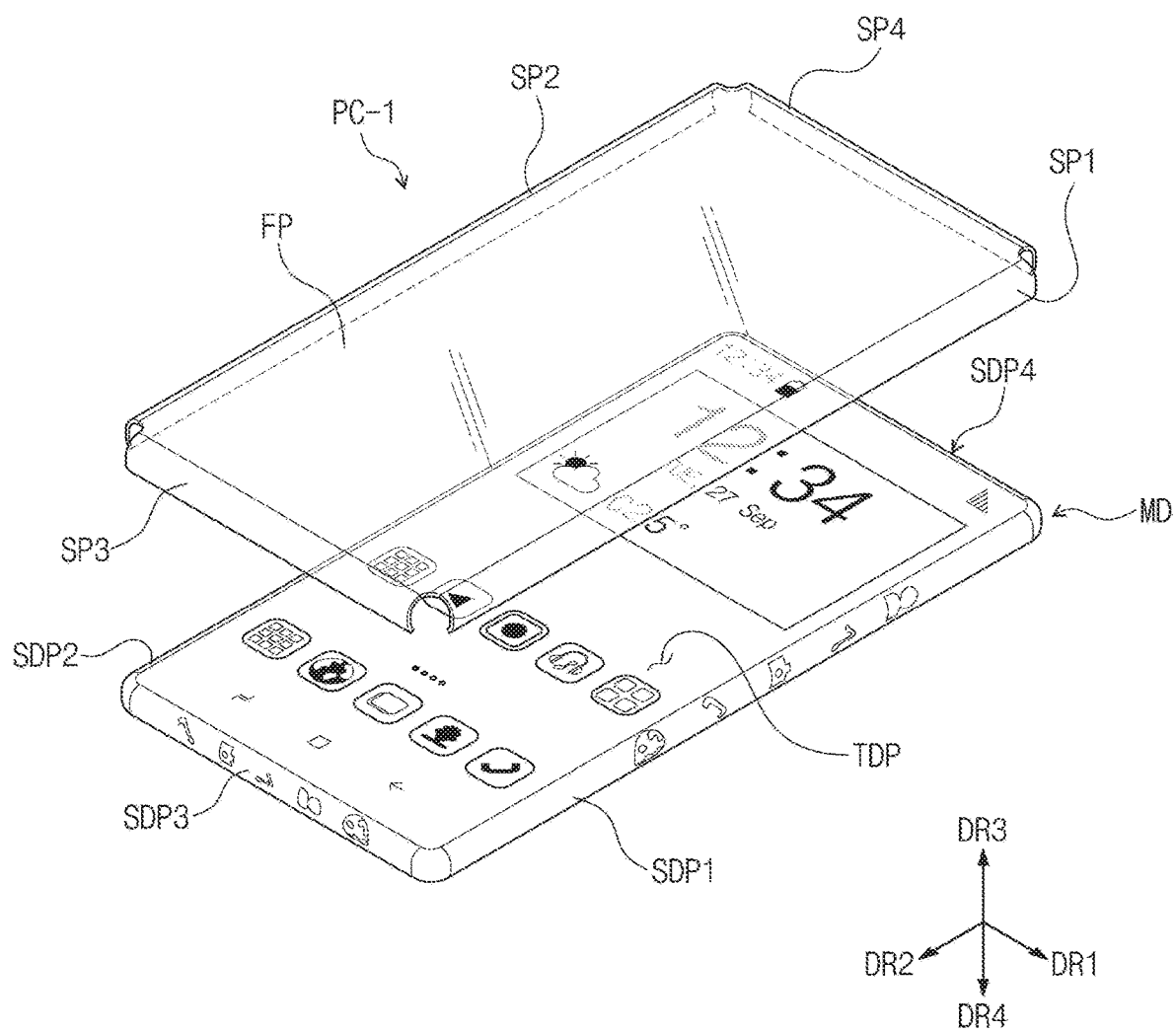
FIG. 3A is a view illustrating a process of providing the portable terminal cover to the portable terminal according to an embodiment.
Figure 3B:
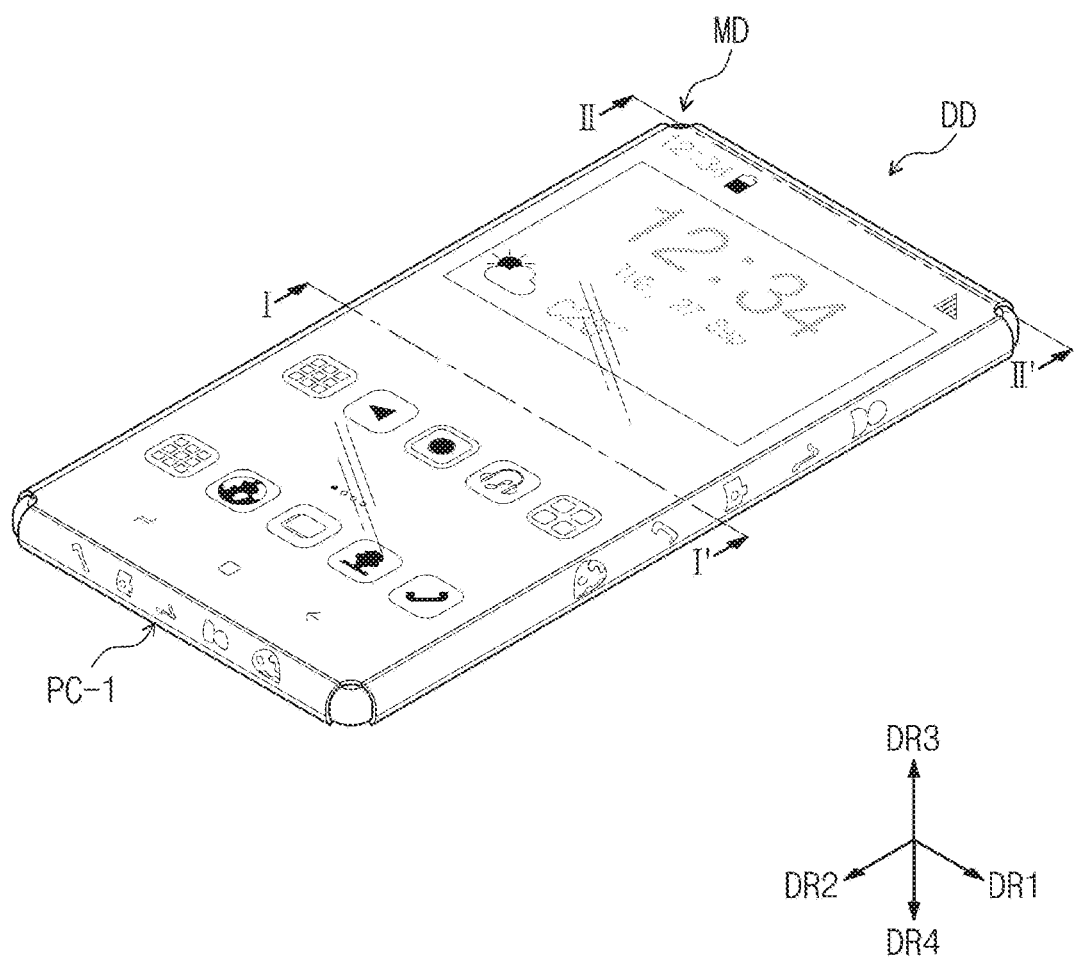
FIG. 3B is a perspective view of the electronic device according to an embodiment.

FIG. 1 is a perspective view illustrating an example of a portable terminal MD provided in an electronic device according to an embodiment. FIGS. 2A and 2B are perspective views of a portable terminal cover PC-1 provided in the electronic device according to an embodiment. FIG. 3A is a view illustrating a process of providing the portable terminal cover PC-1 to the portable terminal MD according to an embodiment, and FIG. 3B is a perspective view of the electronic device DD including the portable terminal cover PC-1 of FIGS. 2A and 2B according to an embodiment.

Referring to FIG. 1, the portable terminal MD according to an embodiment may include at least one side surface display part SDP1, SDP2, SDP3, or SDP4.

The portable terminal MD may be a stereoscopic display device including a top surface display part TDP and a plurality of side surface display parts SDP1, SDP2, SDP3, and SDP4. Each of the plurality of side surface display parts SDP1, SDP2, SDP3, and SDP4 may be a display surface extending from one side of the top surface display part TDP. According to an embodiment, the portable terminal MD may include a main display surface that mainly provides an image in one direction and a plurality of sub display surfaces that provide an image in a direction different from the one direction. The main display surface of the portable terminal MD of FIG. 1 according to an embodiment may be the top surface display part TDP, and the sub display surfaces may be the side surface display parts SDP1, SDP2, SDP3, and SDP4. A main image IM may be displayed on the top surface display part TDP that is the main display surface, and sub images SIM may be displayed on the side surface display parts that are the sub display surfaces.

The side surface display parts SDP1, SDP2, SDP3, and SDP4 may have display surfaces that are not parallel to a display surface of the top surface display part TDP. The plurality of side surface display parts SDP1, SDP2, SDP3, and SDP4 may be display areas that are bent from one side of the top surface display part TDP to extend. For example, the plurality of side surface display parts SDP1, SDP2, SDP3, and SDP4 may be bent display areas.

The top surface display part TDP may provide an image IM in a direction of a third directional axis DR3. The top surface display part TDP may be a plane parallel to a surface that is defined by a first directional axis DR1 and a second directional axis DR2. That is, the top surface display part TDP may provide an image IM in the direction of the third directional axis DR3, which is a normal direction with respect to the plane defined by the first directional axis DR1 and the second directional axis DR2.

In FIG. 1, a fourth directional axis DR4 may be a direction that extends in a direction opposite to the third directional axis DR3. For example, the direction of the third directional axis DR3 may be a direction in which the top surface display part TDP provides an image to the user, and the direction of the fourth directional axis DR4 may be a direction in which the user faces the top surface display part TDP. The directions indicated by the first to third directional axes DR1, DR2, DR3, and DR4 may be a relative concept and thus changed into directions illustrated in the drawings.

The side surface display parts SDP1, SDP2, SDP3, and SDP4 may provide images in directions crossing the first directional axis DR1, the second directional axis DR2, and the third directional axis DR3. In the portable terminal MD of FIG. 1, the side surface display part may include four side surface display parts SDP1, SDP2, SDP3, and SDP4, which respectively provide images in the directions crossing the first directional axis DR1, the second directional axis DR2, and the third directional axis DR3. However, the embodiment of the inventive concept is not limited thereto. For example, the number of side surface display parts may vary according to a change in design of the portable terminal MD. That is, the portable terminal DM according to an embodiment may include more than four side surface display parts.

The side surface display parts SDP1, SDP2, SDP3, and SDP4 may be display surfaces extending from the top surface display part TDP, and the side surface display parts SDP1, SDP2, SDP3, and SDP4 and the top surface display part TDP may be controlled together to provide one connected image. Also, the side surface display parts SDP1, SDP2, SDP3, and SDP4 and the top surface display part TDP may be controlled at the same time to provide images different from each other.

On the other hand, according to an embodiment, the top surface display part TDP may provide the main image IM, and the side surface display parts SDP1, SDP2, SDP3, and SDP4 may provide the sub images SIM. For example, a main image may be displayed on the top surface display part TDP, and simple icons for providing information may be displayed on the side surface display parts SDP1, SDP2, SDP3, and SDP4.

Referring to FIG. 1, the portable terminal MD includes corner parts CDP. The corner parts CDP are respectively disposed between the side surface display parts SDP1, SDP2, SDP3, and SDP4, which are adjacent to each other. The corner parts CDP may be non-display areas on which an image is not displayed. For example, when the top surface display part TDP of the portable terminal MD according to an embodiment has a rectangular shape, the corner parts CDP may be disposed at edge portions respectively corresponding to vertexes of the rectangular shape. The portable terminal MD may also include a bottom surface BDP.

Although a smartphone is exemplified as the portable terminal MD in FIG. 1, an embodiment of the inventive concept is not limited thereto. For example, the portable terminal MD may include a tablet PC, a navigation device, a game device, a portable media player (PMP), and the like. However, an embodiment of the inventive concept is not limited thereto.

FIGS. 2A and 2B are perspective views of the portable terminal cover according to an embodiment. FIG. 2A is a perspective view when the portable terminal cover is viewed from an upper side, and FIG. 2B is a perspective view when the portable terminal cover is viewed from a lower side. That is, FIG. 2A is a perspective view when viewed downward in the direction of the fourth directional axis DR4, and FIG. 2B is a perspective view when viewed upward in the direction of the third directional axis DR3.

The portable terminal cover PC-1 according to an embodiment may include a plurality of side surfaces SP1, SP2, SP3, and SP4 and a front surface FP connected to at least one side surface of the plurality of side surfaces SP1, SP2, SP3, and SP4. The plurality of side surfaces SP1, SP2, SP3, and SP4 may be portions that cover the side surface display parts SDP1, SDP2, SDP3, and SDP4 of the above-described portable terminal. The front surface FP may cover the top surface display part TDP of the above-described portable terminal.

The plurality of side surfaces SP1, SP2, SP3, and SP4 may be transparent. In the portable terminal cover PC-1 according to an embodiment, the side surfaces SP1, SP2, SP3, and SP4 may be transparent that is enough to allow the user to recognize the images provided on the side surface display parts SDP1, SDP2, SDP3, and SDP4. The plurality of side surfaces SP1, SP2, SP3, and SP4 may be provided as transparent members that are enough to transmit the images provided on the side surface display parts SDP1, SDP2, SDP3, and SDP4.

In this specification, the term "transparent" may mean a degree to which an image provided on the portable terminal is confirmed in the state in which the portable terminal cover is covered. For example, each of the side surfaces SP1, SP2, SP3, and SP4 may have transmittance of about 50% or more, particularly, about 70% or more.

For example, the transparent member may include glass, a polymer material, or rubber. Particularly, the transparent side surfaces SP1, SP2, SP3, and SP4 may be made of tempered glass, a polymer material including polycarbonate, polymethylmethacrylate, polyethylene terephthalate, or the like, or a rubber material such as silicone rubber and the like. However, an embodiment of the inventive concept is not limited thereto. For example, various polymer materials or rubber materials, which are transparent, may be used as a material for forming the side surfaces of the portable terminal cover PC-1 according to an embodiment.

Also, the side surfaces SP1, SP2, SP3, and SP4 may be protection members that protect the side surface display parts SDP1, SDP2, SDP3, and SDP4. The side surfaces SP1, SP2, SP3, and SP4 may surround the side surface display parts SDP1, SDP2, SDP3, and SDP4 to prevent the side surface display parts SDP1, SDP2, SDP3, and SDP4 from being exposed during the use of the portable terminal, thereby protecting the side surface display parts SDP1, SDP2, SDP3, and SDP4 against an external impact.

Also, even though the side surfaces SP1, SP2, SP3, and SP4 cover the side surface display parts SDP1, SDP2, SDP3, and SDP4, the user may provide a touch input to the side surface display parts SDP1, SDP2, SDP3, and SDP4. The information and the images provided through the side surface display parts SDP1, SDP2, SDP3, and SDP4 may be provided to the user through the side surfaces SP1, SP2, SP3, and SP4, and the user may indirectly touch the side surface display parts SDP1, SDP2, SDP3, and SDP4 through the side surfaces SP1, SP2, SP3, and SP4 to confirm the information and the images provided to the portable terminal MD.

In an embodiment illustrated in FIGS. 2A and 2B, the portable terminal cover PC-1 may include the four side surfaces SP1, SP2, SP3, and SP4, and each of the four side surfaces SP1, SP2, SP3, and SP4 may be connected to the front surface FP. Each of the four side surfaces SP1, SP2, SP3, and SP4 may be connected to a side surface of the front surface FP. Also, in the portable terminal cover PC-1 according to an embodiment, the four side surfaces SP1, SP2, SP3, and SP4 and the front surface FP may have an integrated shape. In the portable terminal cover PC-1 according to an embodiment, the four side surfaces SP1, SP2, SP3, and SP4 and the front surface FP may be formed in a single body.

In the portable terminal cover PC-1 according to an embodiment, the front surface FP and the side surfaces SP1, SP2, SP3, and SP4 may have an integrated shape and be transparent. For example, the front surface FP and the side surfaces SP1, SP2, SP3, and SP4 may be integrally formed by using a transparent material.

Referring to FIGS. 2A and 2B, in the portable terminal cover PC-1 according to an embodiment, the connection part disposed between the side surfaces SP1, SP2, SP3, and SP4, which are adjacent to each other, may be omitted. That is, in the portable terminal cover PC-1 according to an embodiment, the side surfaces SP1, SP2, SP3, and SP4, which are adjacent to each other, may be disposed to be spaced apart from each other so that a corner part CDP of the portable terminal MD is exposed to the outside.

The portable terminal cover PC-1 according to an embodiment may have an insertion space OS1 defined by the four side surfaces SP1, SP2, SP3, and SP4 and the front surface FP. The insertion space OS1 may be a space that is surrounded by the four side surfaces SP1, SP2, SP3, and SP4 and the front surface FP. The insertion space OS1 may be a portion in which the portable terminal MD is seated. In the portable terminal cover PC-1 according to an embodiment, the portable terminal MD may be inserted into the insertion space OS1. Here, a bottom surface BDP of the portable terminal MD may not be covered by the portable terminal cover PC-1, but be exposed. That is, in the portable terminal cover PC-1 according to an embodiment, a surface facing the front surface FP may be opened so that the bottom surface BDP of the portable terminal MD is exposed.

FIG. 3A is a view illustrating a process of providing the portable terminal cover PC-1 to the portable terminal MD according to an embodiment. The portable terminal cover PC-1 of FIGS. 2A and 2B according to an embodiment may cover the top surface display part TDP and the side surface display parts SDP1, SDP2, SDP3, and SDP4 of the portable terminal MD.

FIG. 3B is a perspective view illustrating an example of an electronic device DD in which the portable terminal cover PC-1 covers the portable terminal MD according to an embodiment. Referring to FIG. 3B, an image or picture provided on the portable terminal MD may be directly confirmed on the electronic device DD including the portable terminal cover PC-1 due to the portable terminal cover PC-1 made of the transparent material. That is, in the portable terminal cover PC-1 according to an embodiment, the side surfaces SP1, SP2, SP3, and SP4 as well as the front surface FP may be made of the transparent material to confirm the image provided on the side surface display parts SDP1, SDP2, SDP3, and SDP4 without opening the cover while protecting the portable terminal MD against the external impact.

Figure 4A:
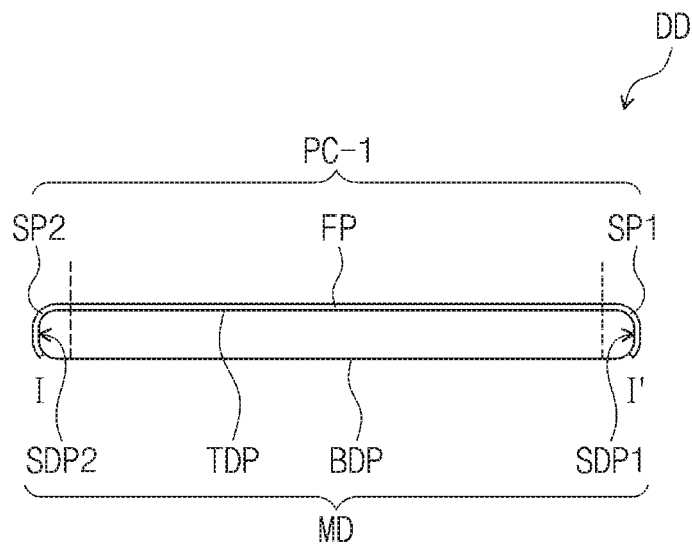
FIGS. 4A and 4B are partial cross-sectional views taken along line I-I' and II-II' of FIG. 3B, respectively.
Figure 4B:
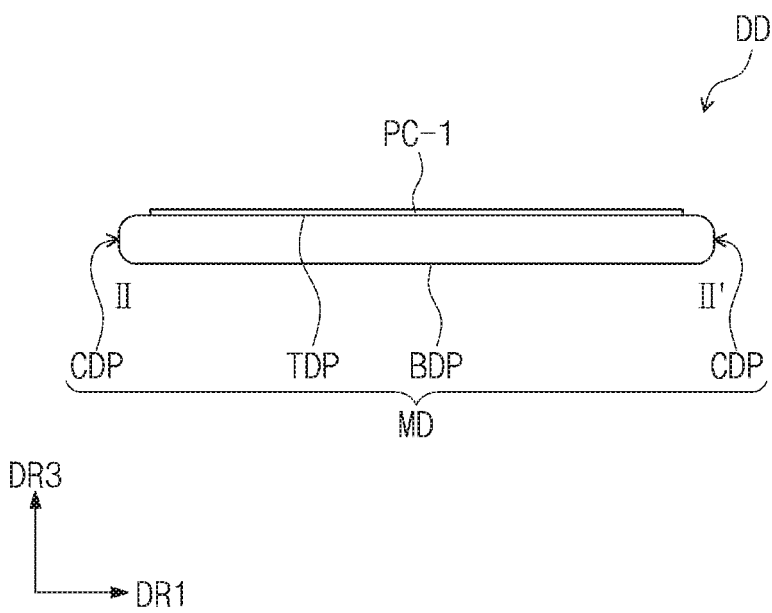

FIGS. 4A and 4B are partial cross-sectional views taken along line I-I' and II-II' of FIG. 3B, respectively. FIGS. 4A and 4B illustrate an example of the electronic device DD including the portable terminal MD and the portable terminal cover PC-1.

Referring to FIG. 4A, in a cross-section defined by the first directional axis DR1 and the third directional axis DR3, the portable terminal cover PC-1 according to an embodiment may include the front surface FP and the side surfaces SP1 and SP2 to cover and protect the top surface display part TDP and the side surface display parts SPD1 and SDP2 of the portable terminal MD. Here, the front surface FP and the side surfaces SP1 and SP2 may be integrally provided. In the portable terminal cover PC-1, a rear surface facing the front surface FP may be opened to expose a bottom surface BDP of the portable terminal MD.

FIG. 4B is a partial cross-sectional view taken along line II-II' of FIG. 3B. Here, the corner part CDP of the portable terminal MD may not be covered by the portable terminal cover PC-1, but be exposed.

Figure 5:
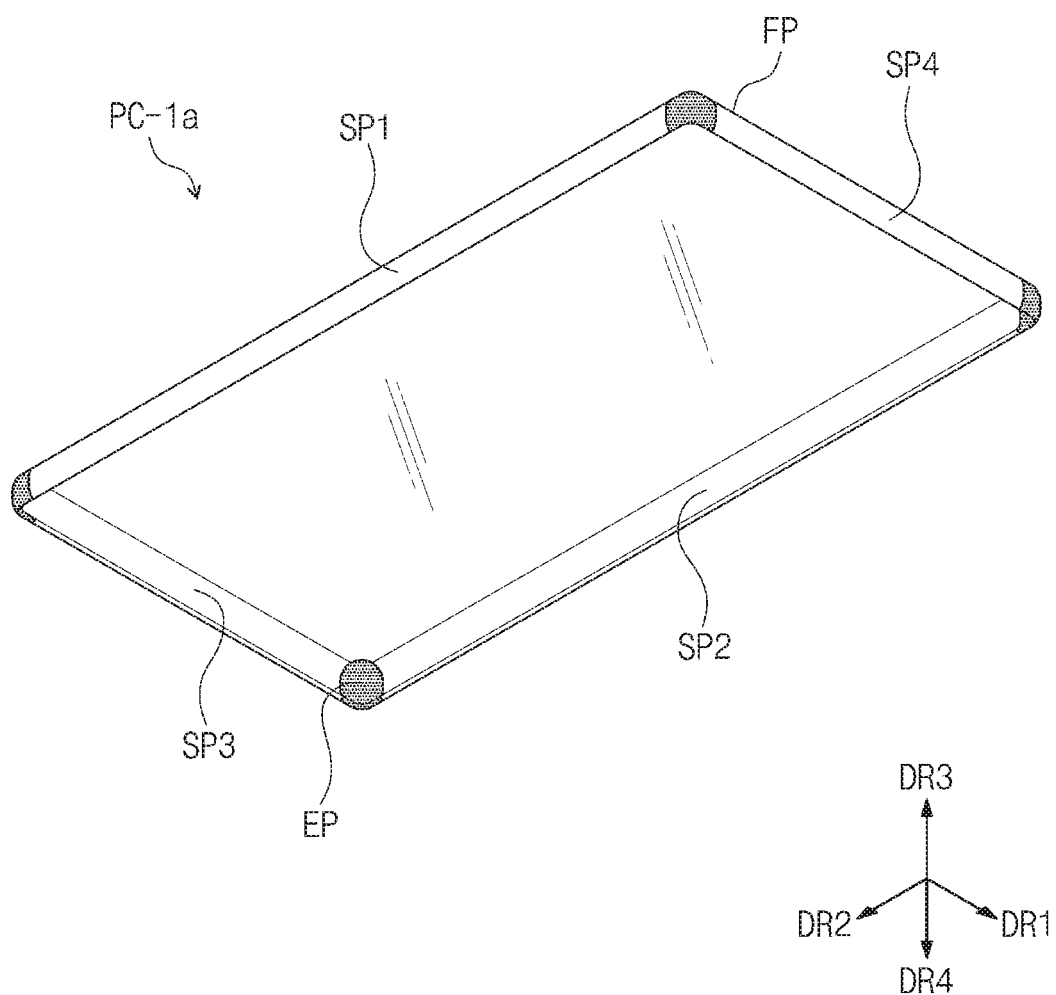
FIG. 5 is a perspective view of a portable terminal cover according to an embodiment.

FIG. 5 is a perspective view of a portable terminal cover according to another embodiment. FIG. 6 is a perspective view illustrating an example of an electronic device DD-1 including a portable terminal cover PC-1a of FIG. 5 according to another embodiment. FIG. 7 is a partial cross-sectional view taken along line III-III' of FIG. 6. In the descriptions with reference to FIGS. 5 to 7, contents duplicated with those described with reference to FIGS. 1 to 4B will be omitted, and thus, their differences will be mainly described.

The portable terminal cover PC-1a of FIG. 5 is different from the portable terminal cover PC-1 of FIGS. 2A and 2B in that the portable terminal cover PC-1a further include a connection part EP. That is, the portable terminal cover PC-1a according to another embodiment may include four side surfaces SP1, SP2, SP3, and SP4, a front surface FP, and four connection parts EP. In the portable terminal cover PC-1a according to another embodiment, descriptions of the four side surfaces SP1, SP2, SP3, and SP4 and the front surface FP may be the same as those of the portable terminal cover PC-1 of FIGS. 2A and 2B according to another embodiment.

For example, the portable terminal cover PC-1a according to another embodiment may include the four transparent side surfaces SP1, SP2, SP3, and SP4 and the front surface FP connected to the four side surfaces SP1, SP2, SP3, and SP4. The front surface FP may be transparent.

The connection parts EP may be disposed between the side surfaces SP1, SP2, SP3, and SP4, which are adjacent to each other. In the portable terminal cover PC-1a according to another embodiment, the side surfaces SP1, SP2, SP3, and SP4, the front surface FP, and the connection parts EP may have an integrated shape.

In the electronic device DD-1 of FIGS. 6 and 7, the connection parts EP may be portions that cover corner parts CDP of the portable terminal MD. Each of the connection parts EP may be made of a transparent material. On the other hand, each of the connection parts EP according to another embodiment may be made of an opaque material.

For example, in the portable terminal cover PC-1a according to another embodiment, each of the connection parts EP may be made of the same transparent material as each of the side surfaces SP1, SP2, SP3, and SP4. On the other hand, although each of the connection parts EP is made of the transparent material, each of the side surfaces SP1, SP2, SP3, and SP4 may be made of a different material. Particularly, each of the connection parts EP may be made of a material having higher elasticity than that of each of the side surfaces SP1, SP2, SP3, and SP4.

In the portable terminal cover PC-1a according to another embodiment, each of the connection parts EP may be made of an opaque material. For example, each of the connection parts EP may be made of an elastic material with high impact resistance to protect the corner part CDP of the portable terminal MD and also may be made of the opaque material to prevent the corner part CDP of the portable terminal MD from being exposed.

Although not shown, in the portable terminal cover PC-1 according to another embodiment, each of the connection parts EP may include a light emitting device (not shown). The light emitting device (not shown) may emit light having a single color. For example, the light emitting device (not shown) may emit light having a color senor similar to that of an image provided on each of the side surface display parts SDP1, SDP2, SDP3, and SDP4, which are adjacent to each other, to realize the unity of the image provided from the portable terminal MD. However, the embodiment of the inventive concept is not limited thereto. For example, the plurality of connection parts EP may emit light having colors different from each other, or one connection part may emit light having a plurality of colors.

The light emitted from the light emitting device (not shown) may be controlled by the portable terminal MD. In the electronic device DD-1 according to another embodiment, the light emitting device (not shown) may be electrically connected to the portable terminal MD.

Also, the light emitting device (not shown) may perform a function of the display part that provides an image. The light emitting device (not shown) may provide an image connected to the image provided on each of the side surface display parts SDP1, SDP2, SDP3, and SDP4 to realize the unity of the image provided on the side surface display parts SDP1, SDP2, SDP3, and SDP4. The image provided from the connection part EP may be an image provided from the portable terminal MD.

In the electronic device DD-1 according to another embodiment, the light emitting device (not shown) may further include a control unit electrically connected to the portable terminal MD and controlled by the portable terminal MD.

For example, the electronic device DD-1 of FIG. 6 according to another embodiment may drive the portable terminal in the state in which the portable terminal cover is provided. That is, the electronic device DD-1 may control the portable terminal MD through the touch input even though the portable terminal cover PC-1 is installed on the portable terminal.

Figure 8A:
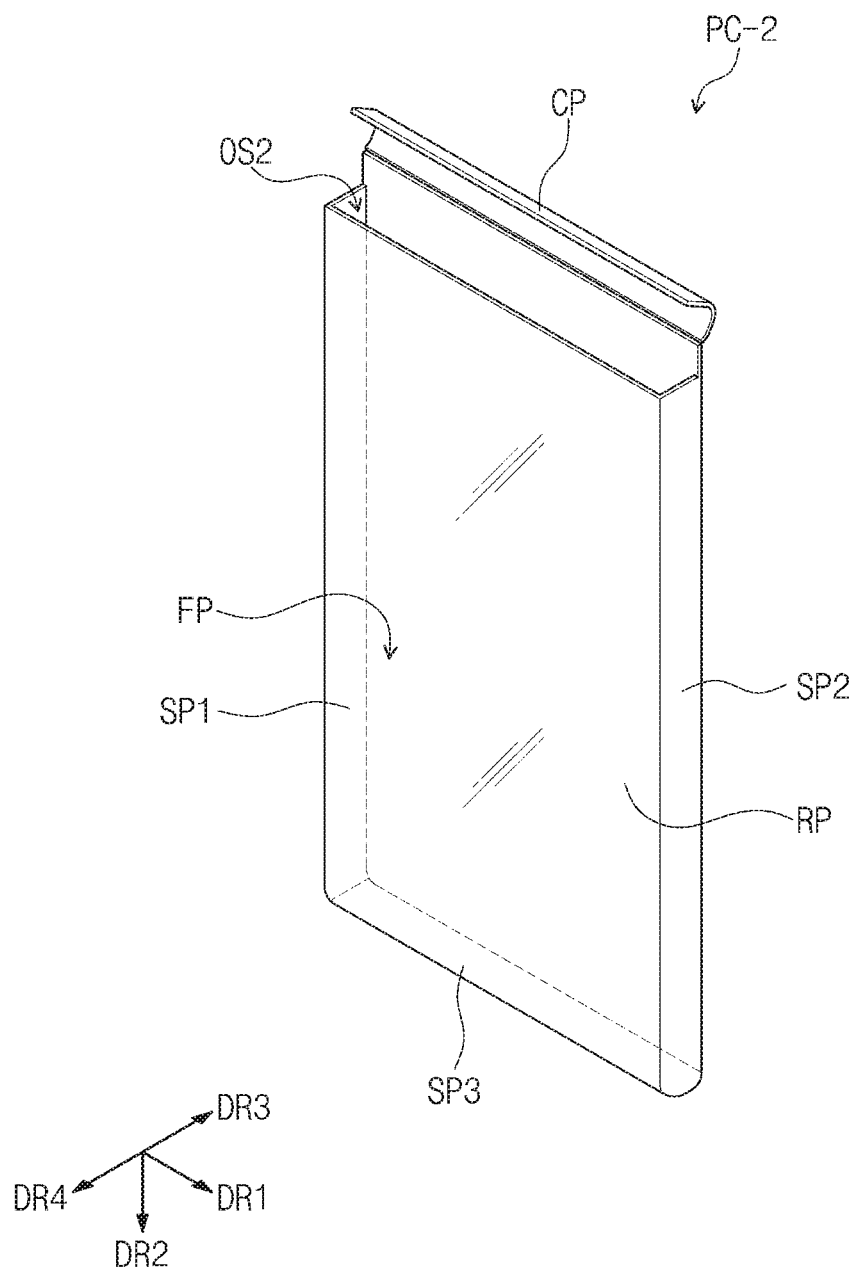
FIGS. 8A, 8B, and 8C are perspective views of the portable terminal cover according to an embodiment.
Figure 8B:
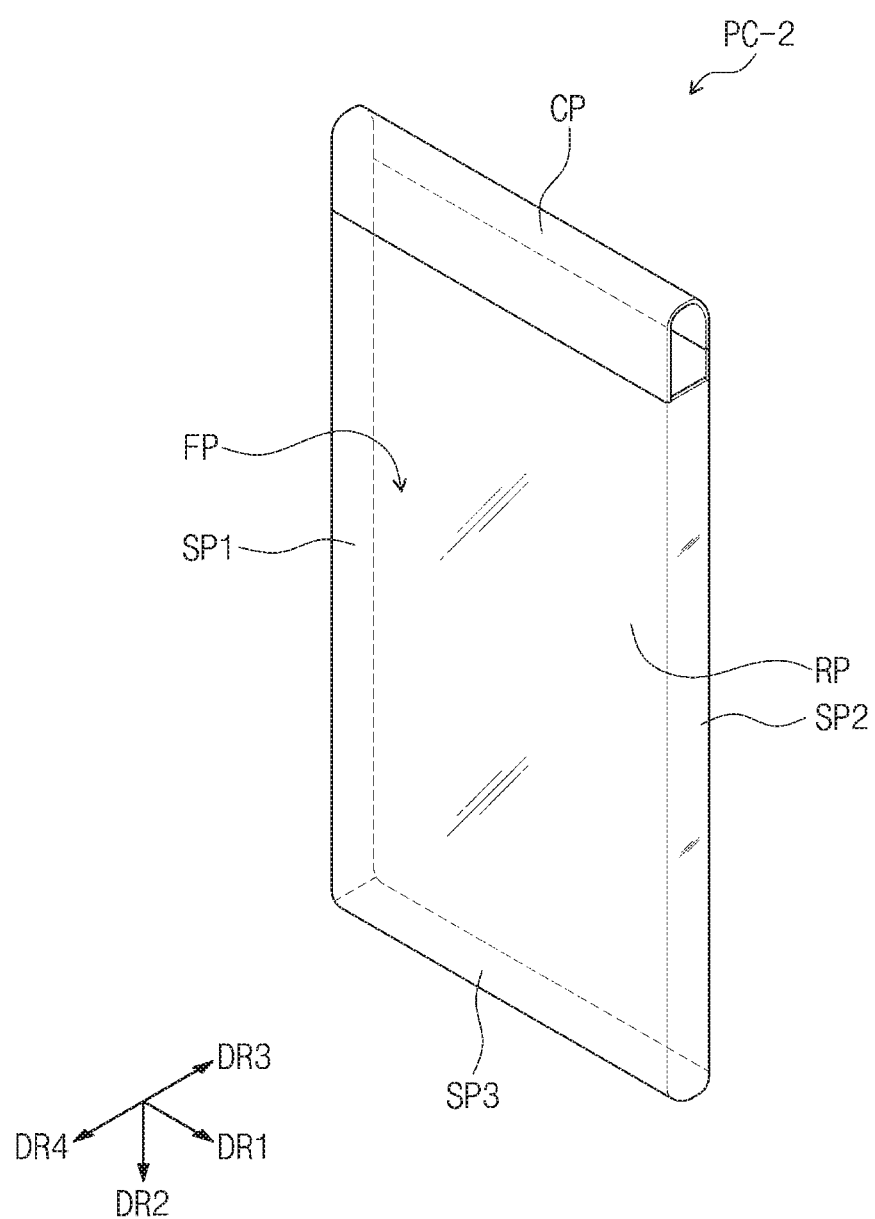
Figure 8C:
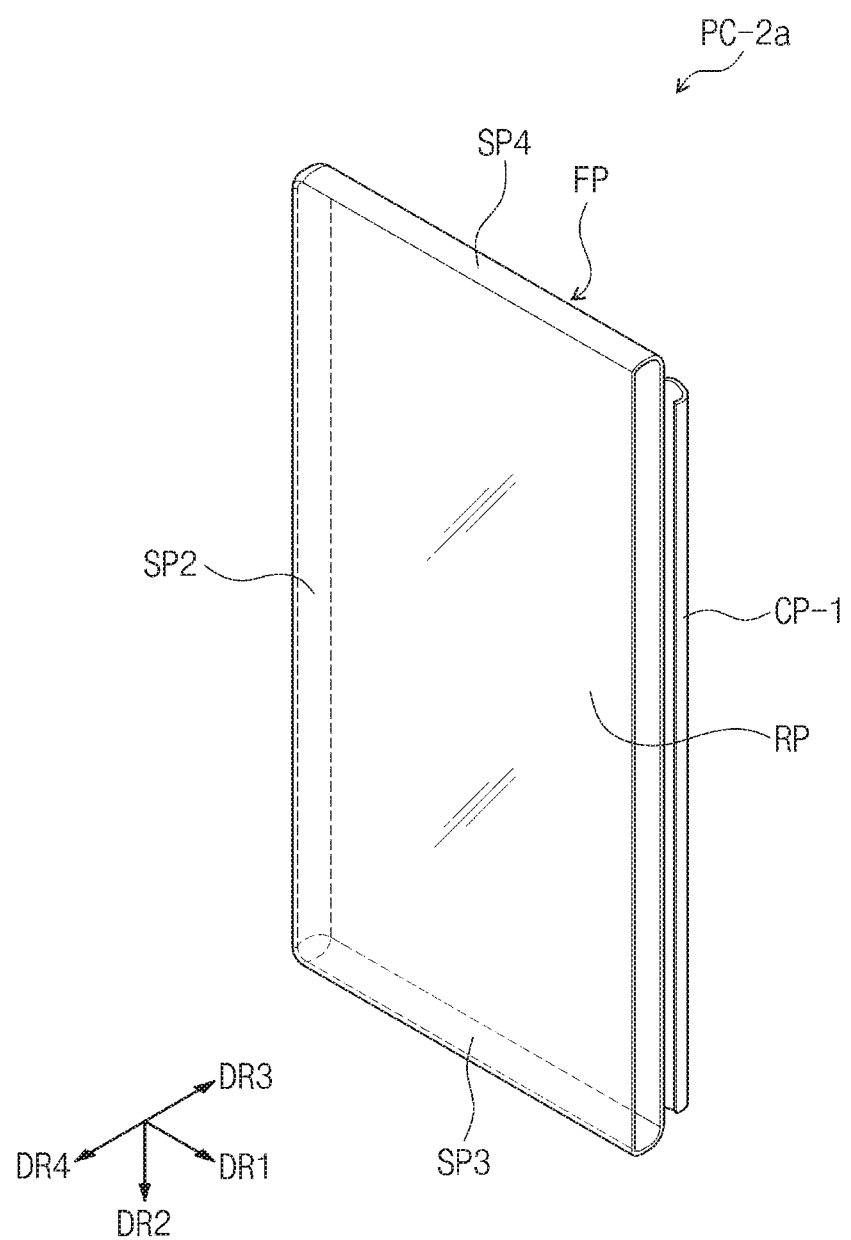
Figure 9A:
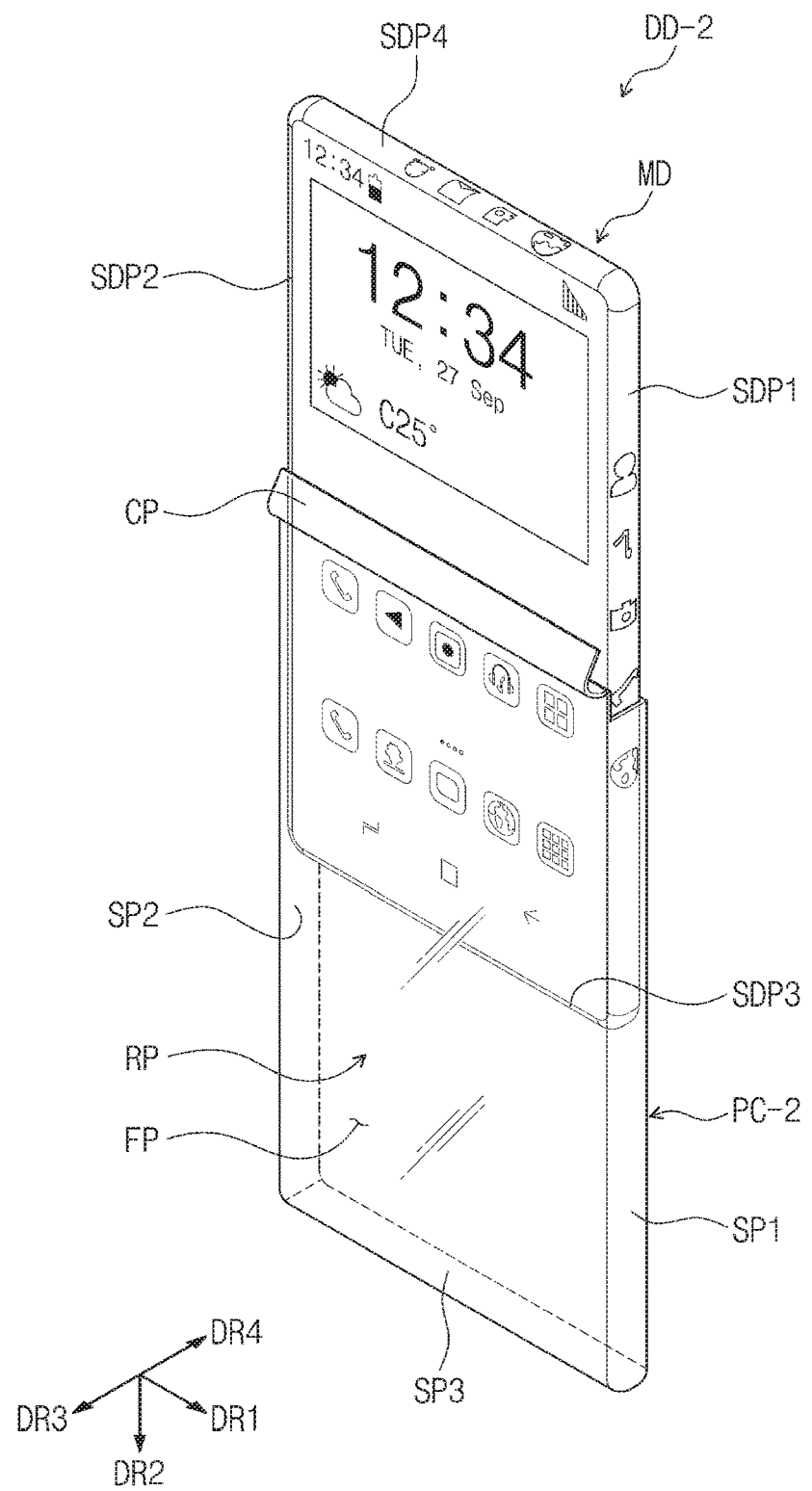
FIG. 9A is a view illustrating a process of providing the portable terminal cover to the portable terminal according to an embodiment.
Figure 9B:
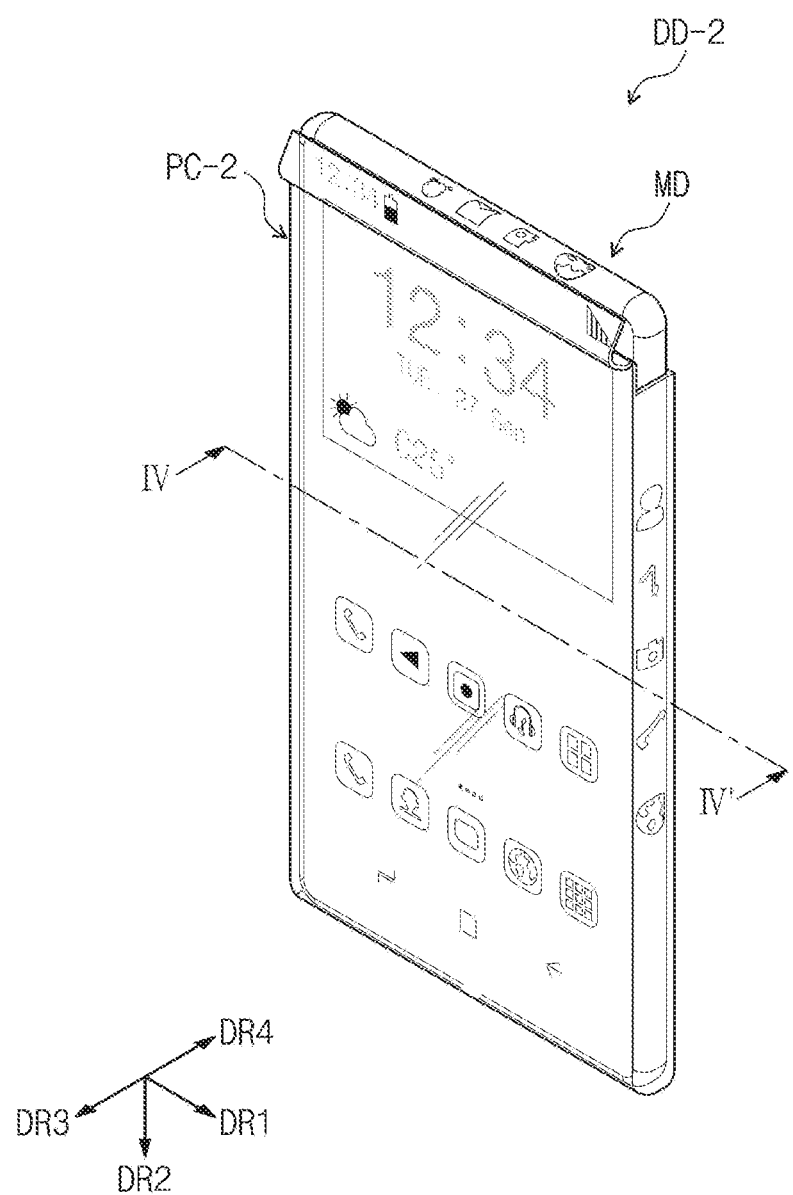
FIG. 9B is a perspective view of the electronic device according to an embodiment.
Figure 10:
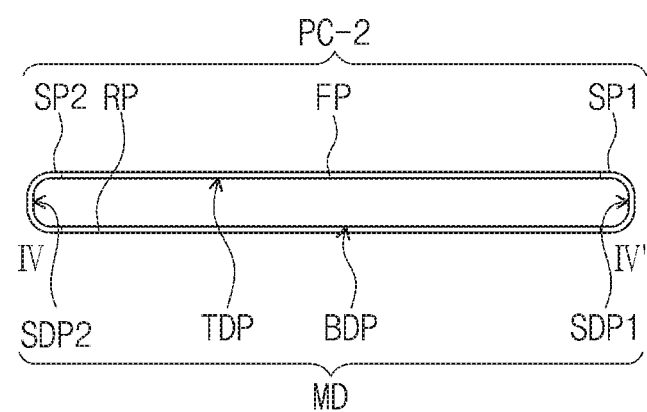
FIG. 10 is a partial cross-sectional view taken along line IV-IV' of FIG. 9B.

FIGS. 8A to 8C are perspective views of portable terminal covers PC-2 and PC-2a according to an embodiment. FIG. 9A is a schematic view illustrating a process of providing the portable terminal cover PC-2 of FIGS. 8A and 8B according to an embodiment. FIG. 9B is a perspective view illustrating an example of an electronic device DD-2 including a portable terminal cover PC-2 of FIG. 8 according to an embodiment, and FIG. 10 is a cross-sectional view taken along line IV-IV' of FIG. 9B.

The portable terminal covers PC-2 and PC-2a of FIGS. 8A to 8C according to an embodiment may include a plurality of transparent side surfaces SP1, SP2, SP3, and SP4, a front surface FP connected to at least one side surface of the side surfaces SP1, SP2, SP3, and SP4, a rear surface RP facing the front surface FP, and cover parts CP and CP-1 covering one side surface of the front surface FP.

Referring to FIGS. 8A and 8B, the portable terminal cover PC-2 according to an embodiment may include transparent first to third side surfaces SP1, SP2, and SP3, a front surface FP connected to the first to third side surfaces SP1, SP2, and SP3, a rear surface RP facing the front surface FP and connected to the third to third side surfaces SP1, SP2, and SP3, and a cover part CP connected to one side of the front surface FP.

FIG. 8C illustrates the portable terminal cover PC-2a according to an embodiment, which includes second to fourth side surfaces SP2, SP3, and SP4, a front surface FP connected to the second to fourth side surfaces SP2, SP3, and SP4, and a cover part CP-1 connected to one side of the front surface FP.

The portable terminal cover PC-2a of FIG. 8C according to an embodiment may be different from the cover part CP-1 of FIGS. 8A and 8B in a connection position. The portable terminal cover PC-2 of FIGS. 8A and 8B according to an embodiment may include the cover part CP at a portion corresponding to a short side of the portable terminal MD having a rectangular shape on the plane. The portable terminal cover PC-2a of FIG. 8C according to an embodiment may include the cover part CP-1 at a portion corresponding to a long side of the portable terminal MD having a rectangular shape on the plane.

The portable terminal covers PC-2 and PC-2a of FIGS. 8A to 8C according to an embodiment may include cover parts CP and CP-1 connected to one side of the front surface FP. In a first mode, the cover parts CP and CP-1 may cover the insertion space OS2 into which the portable terminal is inserted. In a second mode, the cover parts CP and CP-1 may be opened to expose the insertion space OS2.

FIG. 9A is a schematic view illustrating a process of providing the portable terminal cover PC-2 to the portable terminal MD according to an embodiment. Referring to FIGS. 8A to 9A, the portable terminal MD may be provided in the insertion space OS2 that is exposed by the opened cover part CP.

In description with reference to the electronic device DD-2 of FIGS. 9A and 9B according to an embodiment, the cover part CP of the portable terminal cover PC-2 according to an embodiment may cover one side surface of the portable terminal MD in the first mode and expose the one side surface of the portable terminal MD in the second mode.

Referring to FIGS. 8A, 8B, 9A, and 9B, the cover part CP of the portable terminal cover PC-2 according to an embodiment may cover the forth side surface display part SDP4 of the side surface display parts of the portable terminal MD.

For example, the portable terminal MD may be provided in the insertion space OS2 of the portable terminal cover PC-2, and the first to third side surface display parts SDP1, SDP2, and SDP3 of the portable terminal MD may be respectively covered by the first to third side surfaces SP1, SP2, and SP3 of the portable terminal cover PC-2. The cover part CP may cover the fourth side surface display part SDP4 of the portable terminal MD in the first mode and expose the fourth side surface display part SDP 4 in the second mode.

Referring to FIGS. 8A and 8B, the insertion space OS2 into which the portable terminal MD is inserted may be defined by the front surface FP, the rear surface RP, and the three side surfaces SP1, SP2, and SP3. That is, the insertion space OS2 may be a space that is surrounded by the front surface FP, the rear surface RP facing the front surface FP, and the three side surfaces SP1, SP2, and SP3 disposed between the front surface FP and the rear surface RP and respectively connected to three side surfaces of the front surface FP and the rear surface RP.

The front surface FP, the rear surface RP facing the front surface FP, and the three side surfaces SP1, SP2, and SP3 disposed between the front surface FP and the rear surface RP may be an integrated shape. In the portable terminal cover PC-2 according to an embodiment, the front surface FP, the rear surface RP, and the three side surfaces SP1, SP2, and SP3 may be formed in a single body. The three side surfaces SP1, SP2, and SP3 may extend from the three sides of the front surface FP and then be connected to the corresponding three side surfaces of the rear surface RP facing the front surface FP, respectively.

Also, the cover part CP connected to one side surface of the front surface FP may be integrated with the front surface FP, the rear surface RP facing the front surface FP, and the three side surfaces SP1, SP2, and SP3 disposed between the front surface FP and the rear surface RP.

Each of the front surface FP and the three side surfaces SP1, SP2, and SP3 extending from the front surface FP may be made of a transparent material. Each of the front surface FP, the three side surfaces SP1, SP2, and SP3 extending from the front surface FP, and the cover part CP may be made of a transparent material. The rear surface RP may be made of a transparent material or an opaque material.

Each of the front surface FP, the rear surface RP, the three side surfaces SP1, Sp2, and SP3, and the cover part CP may be made of a transparent material. On the other hand, the front surface FP and the three side surfaces SP1, SP2, and SP3 may be made of a material having transmittance greater than that of the rear surface RP. The rear surface RP may be made of an opaque material.

In FIG. 8C, the insertion space may be a space that is surrounded by the front surface FP, the rear surface RP, and the second to fourth side surfaces SP2, SP3, and SP4. The portable terminal cover PC-2a of FIG. 8C may be the same as the portable terminal cover PC-2 of FIGS. 8A and 8B except for the position of the cover part CP-1. In the portable terminal cover PC-2a of FIG. 8C according to an embodiment, the second to fourth side surfaces SP2, SP3, and SP4 may cover the second to fourth side surface pars SDP2, SDP3, and SDP4 of the portable terminal MD, respectively. The cover part CP-1 may cover the first side surface display part SDP1 in the first mode and expose the first side surface display part SDP1 in the second mode.

In the electronic device DD-2 of FIG. 9B according to an embodiment, the portable terminal cover PC-2 may be made of the transparent material to transmit an image provided from the portable terminal MD to the side surfaces SP1, SP2, and SP3 and the front surface FP while protecting the portable terminal MD.

In the electronic device DD-2 according to an embodiment, the portable terminal MD may operate in response to user's indirect touch provided on the portable terminal cover PC-2.

Referring to FIG. 10, the portable terminal cover PC-2 may cover the whole of the portable terminal MD. The portable terminal cover PC-2 may cover a top surface display part TDP, the side surface display parts SDP1 and SDP2, a bottom surface BDP of the portable terminal MD.

Figure 11:
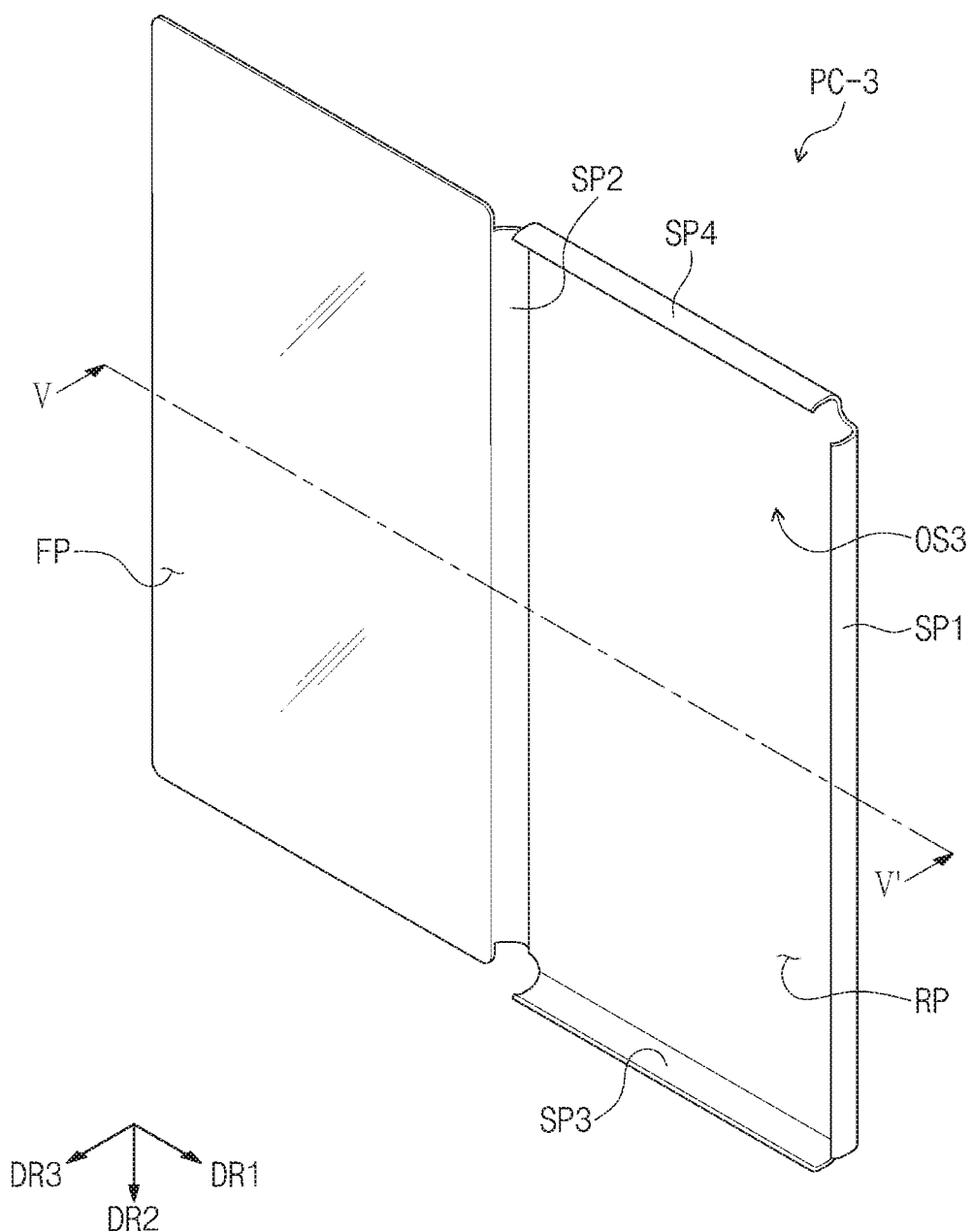
FIGS. 11, 12, and 13 are perspective views of a portable terminal cover according to an embodiment.
Figure 12:
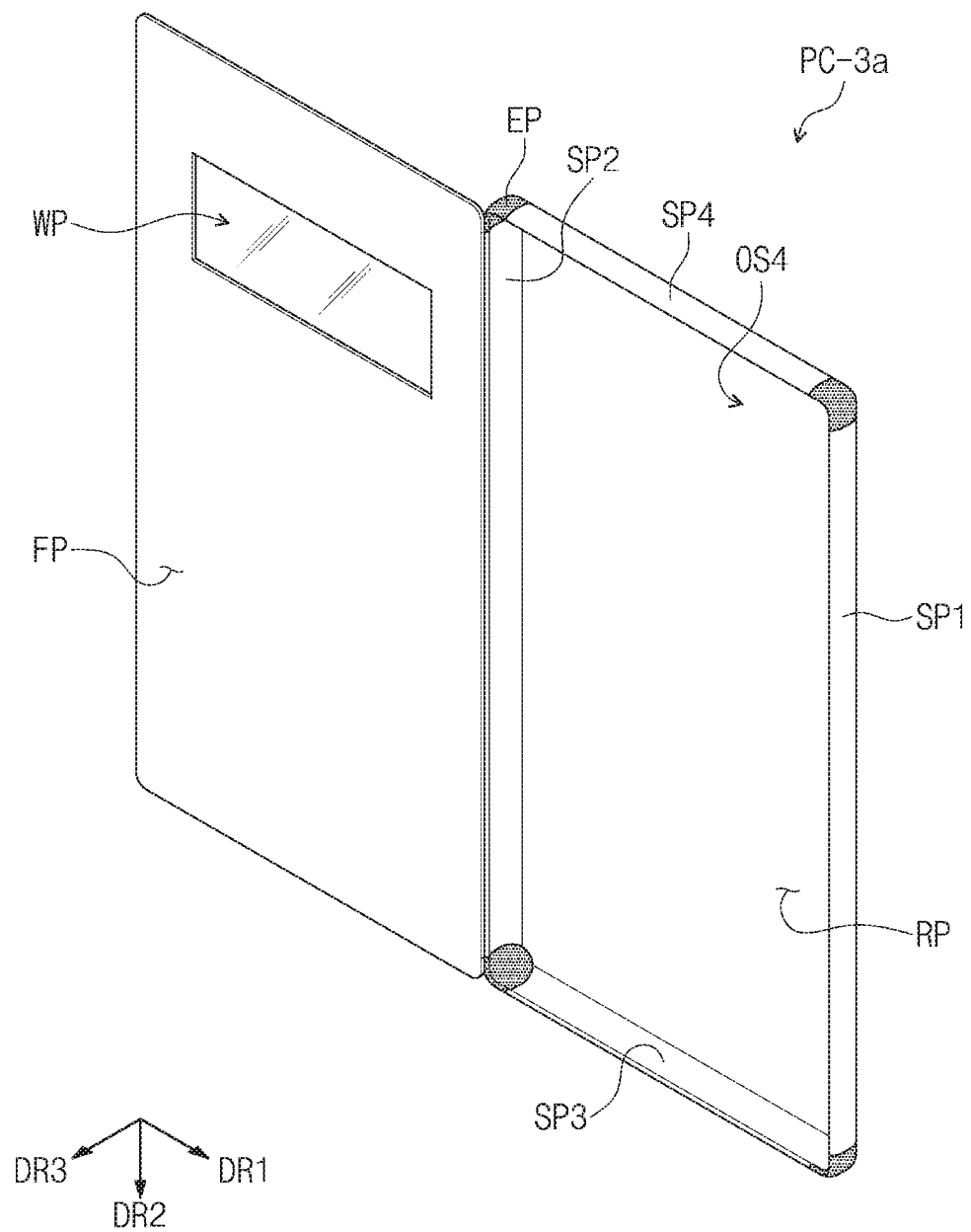
Figure 13:
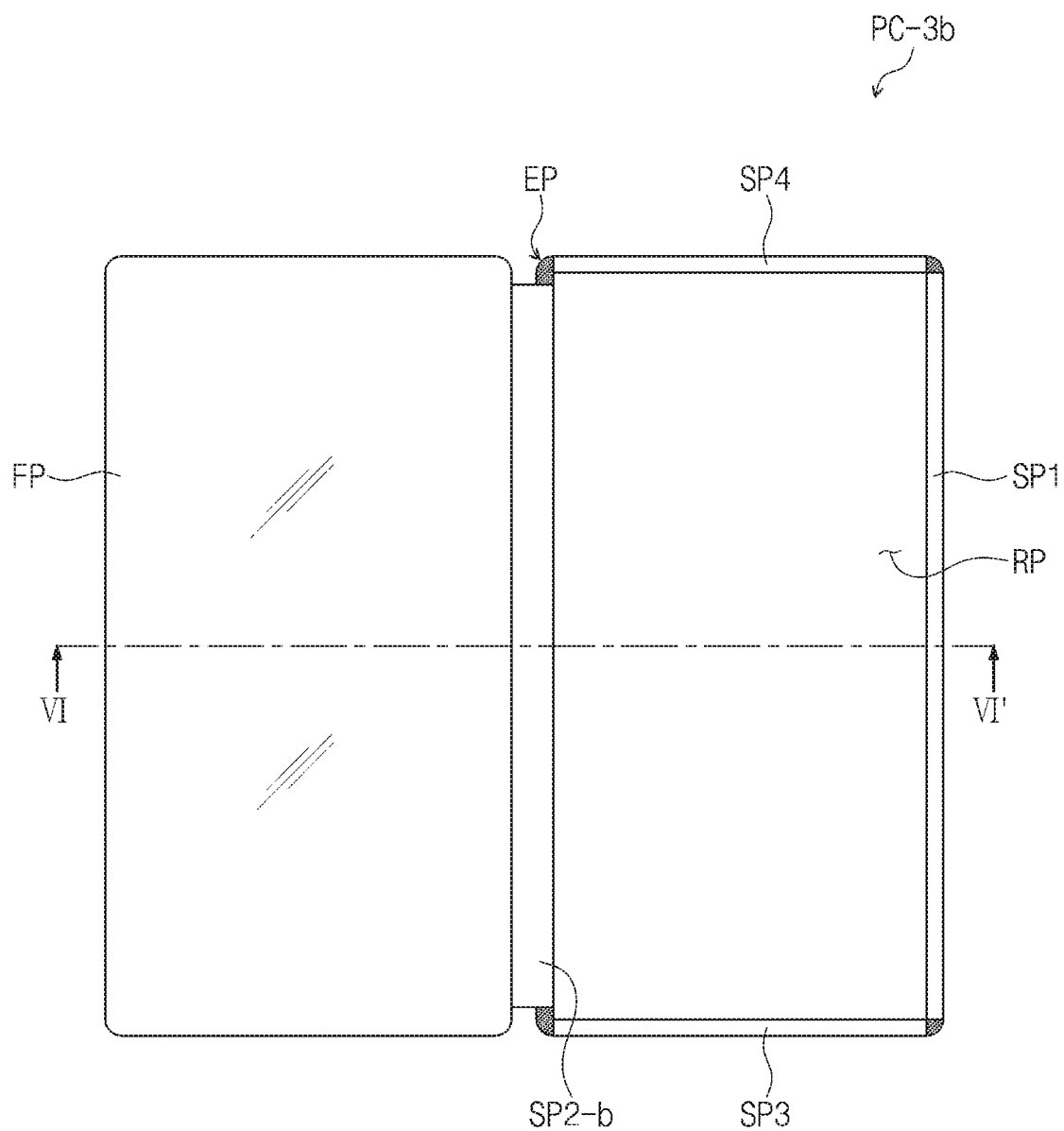
Figure 14A:
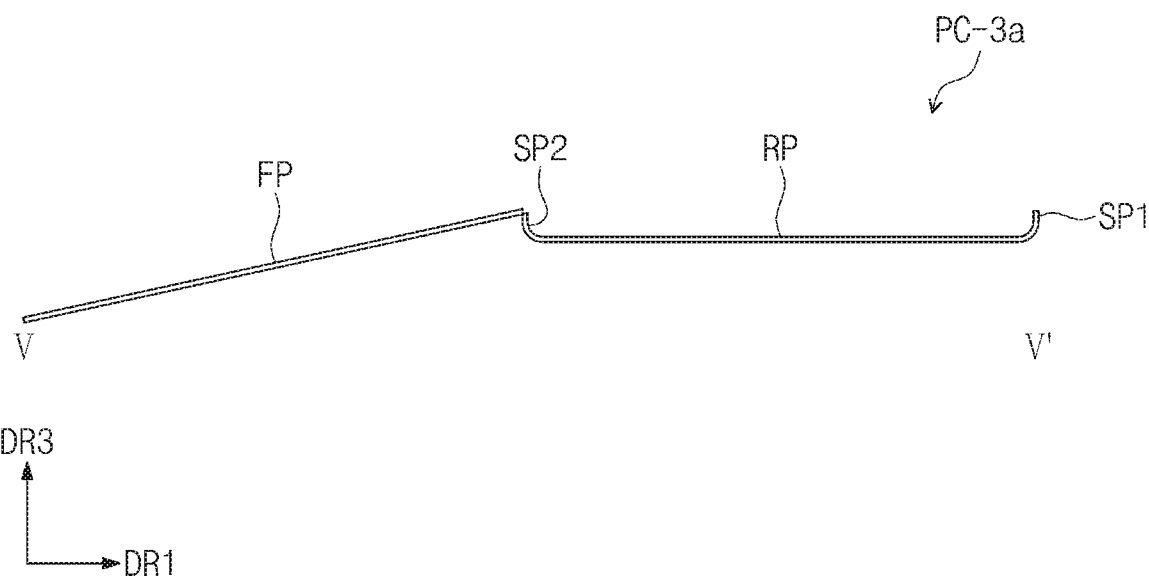
FIG. 14A is a partial cross-sectional view taken along line V-V' of FIG. 11.
Figure 14B:
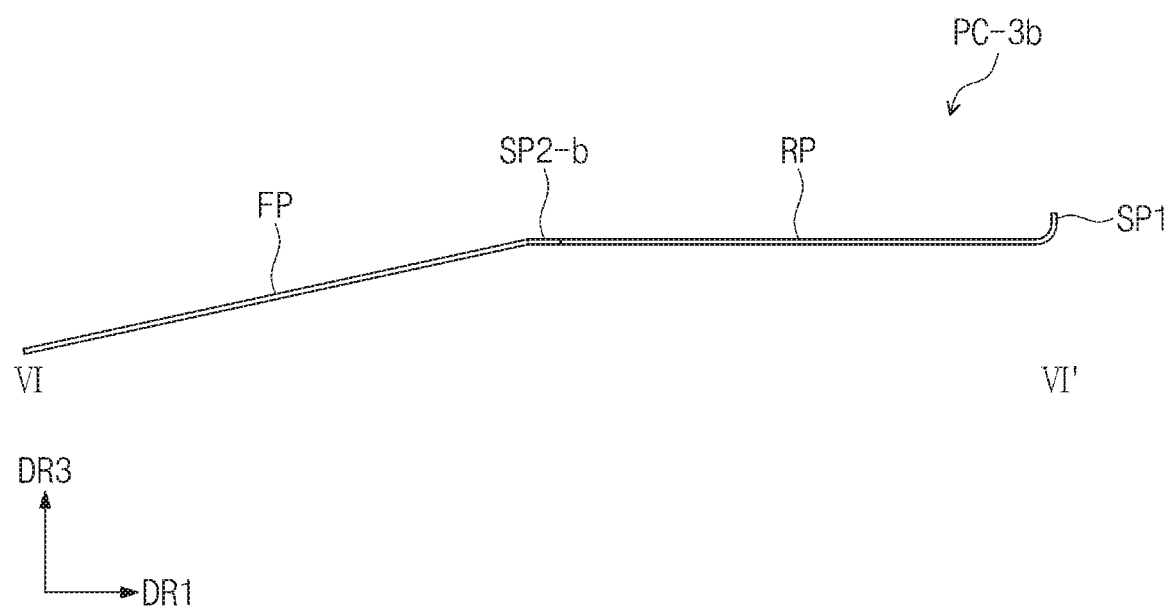
FIG. 14B is a partial cross-sectional view taken along line VI-VI' of FIG. 13.

FIGS. 11 to 13 are perspective views of a portable terminal cover according to an embodiment. FIGS. 14A and 14B are cross-sectional views of the portable terminal covers of FIGS. 11 and 13, respectively. FIG. 14A is a cross-sectional view taken along line V-V' of FIG. 11, and FIG. 14B is a cross-sectional view taken along line VI-VI' of FIG. 13.

In descriptions of portable terminal covers PC-3, PC-3a, and PC-3b of FIGS. 11 to 14B according to an embodiment, description duplicated with those of FIGS. 1 to 10 may be omitted, and thus, their differences will be mainly described. For example, in the portable terminal covers PC-3, PC-3a, and PC-3b according to an embodiment, a front surface FP and side surfaces SP1, SP2, SP3, and SP4 may be the same as those of FIGS. 1 to 4B.

The portable terminal covers PC-3, PC-3a, and PC-3b of FIGS. 11 to 13 according to an embodiment may include a plurality of transparent side surfaces SP1, SP2, SP3, and SP4, a front surface FP, and a rear surface RP.

The portable terminal cover PC-3 of FIG. 11 according to an embodiment may include the first to fourth side surfaces SP1, SP2, SP3, and SP4. Also, one side surface of the first to fourth side surfaces SP1, SP2, SP3, and SP4 may extend from one sides of the front surface FP. The rear surface RP may face the front surface FP that is disposed to cover the top surface display part TDP (see FIG. 1). Referring to the portable terminal cover PC-3 of FIG. 11 according to an embodiment, the front surface FP may be connected to the second side surface SP2 of the plurality of side surfaces SP1, SP2, SP3, and SP4.

Each of the plurality of side surface SP1, SP2, SP3, and SP4 may be connected to one side of the rear surface RP. In the portable terminal cover PC-3 of FIG. 11 according to an embodiment, the first to fourth side surfaces SP1, SP2, SP3, and SP4 may extend from four side surfaces of the rear surface RP, respectively. The first to fourth side surfaces SP1, SP2, SP3, and SP4 and the rear surface RP may have an integrated shape. Each of the first to fourth side surfaces SP1, SP2, SP3, and SP4 may be bent from one side of the rear surface RP. Each of the first to fourth side surfaces SP1, SP2, SP3, and SP4 may be bent from the rear surface RP in the direction of the third directional axis DR3. That is, each of the first to fourth side surfaces SP1, SP2, SP3, and SP4 may be bent in a direction of the front surface FP that covers the top surface display part TDP (see FIG. 1). Each of the first to fourth side surfaces SP1, SP2, SP3, and SP4 may include a curved surface that is curved in the direction of the third directional axis DR3.

FIG. 14A is a cross-sectional view taken along line V-V' of FIG. 11. Referring to FIG. 14A, each of the side surfaces SP1 and SP2 may be bent from the rear surface RP in the direction of the third directional axis DR3. That is, in an embodiment of FIGS. 11 and 14A, the second side surface SP2 may be maintained in the state bent in the direction of the third directional axis DR3 even though the front surface FP is opened.

FIG. 14A is a cross-sectional view of the portable terminal cover PC-3 on a plane parallel to that defined by the first directional axis DR1 and the third directional axis DR3. Although not shown, in the cross-section of the portable terminal cover PC-3 on the plane parallel to that defined by the second directional axis DR2 and the third directional axis DR3, the side surfaces SP3 and SP4 may be bent in the direction of the third direction axis DR3.

The portable terminal cover PC-3 of FIG. 11 according to an embodiment provides an insertion space OS3 defined by the first to fourth side surfaces SP1, SP2, SP3, and SP4 and the rear surface RP. The insertion space OS3 may be a portion that is surrounded by the first to fourth side surfaces SP1, SP2, SP3, and SP4 and the rear surface RP. The portable terminal MD (see FIG. 1) may be seated in the insertion space OS3. The portable terminal cover PC-3 may be provided so that the bottom surface BDP (see FIG. 1) of the portable terminal MD (see FIG. 1) comes into contact with the rear surface RP. The first to fourth side surfaces SP1, SP2, SP3, and SP4 of the portable terminal cover PC-3 may cover the first to fourth side surface display parts SDP1, SDP2, SDP3, and SDP4 of the portable terminal MD, respectively.

Each of the first to fourth side surfaces SP1, SP2, SP3, and SP4 covering the first to fourth side surface display parts SDP1, SDP2, SDP3, and SDP4 may be made of a transparent material. In the portable terminal cover PC-3 according to an embodiment, the rear surface RP may be made of the same material as each of the first to fourth side surfaces SP1, SP2, SP3, and SP4. That is, the rear surface RP may be transparent. However, an embodiment of the inventive concept is not limited thereto. For example, the rear surface RP may be opaque, unlike the first to fourth side surfaces SP1, SP2, SP3, and SP4.

Although not shown, the rear surface RP of the portable terminal cover PC-3 according to an embodiment may become the bottom surface BDP (see FIG. 1) of the portable terminal MD (see FIG. 1). For example, when the bottom surface BDP (see FIG. 1) of the portable terminal MD (see FIG. 1) is detachable, the rear surface RP of the portable terminal cover PC-3 may be used instead of the bottom surface BDP (see FIG. 1) of the portable terminal MD (see FIG. 1).

For example, when the rear surface RP of the portable terminal cover PC-3 is used instead of the bottom surface BDP (see FIG. 1) of the portable terminal MD (see FIG. 1), the rear surface RP of the portable terminal cover PC-3 may further include a coupling part (not shown) coupled to the portable terminal MD (see FIG. 1).

In the portable terminal cover PC-3 according to an embodiment, the plurality of side surfaces SP1, SP2, SP3, and SP4, which are adjacent to each other, may be spaced apart from each other. That is, a connection part of the portable terminal cover PC-3 may be omitted at a portion corresponding to the corner part CDP (see FIG. 1) of the portable terminal MD (see FIG. 1).

The front surface FP of the portable terminal cover PC-3 according to an embodiment may be transparent. In an embodiment, the front surface FP may be connected to one side surface of the plurality of side surfaces SP1, SP2, SP3, and SP4. Although the front surface FP is connected to the second side surface SP2 in FIG. 11, an embodiment of the inventive concept is not limited thereto. The front surface may be connected to the first side surface SP1, the third side surface SP3, or the fourth side surface SP4.

In the portable terminal cover PC-3 according to an embodiment, the plurality of side surfaces SP1, SP2, SP3, and SP4, the rear surface RP, and the front surface FP may be integrated with each other.

The front surface FP according to an embodiment may be opaque. In the portable terminal cover PC-3 according to an embodiment, each of the plurality of side surfaces SP1, SP2, SP3, and SP4, the rear surface RP, and the front surface FP may be opaque. Also, all of the plurality of side surfaces SP1, SP2, SP3, and SP4 and the front surface FP may be transparent, and the rear surface RP may be opaque.

FIG. 12 is a perspective view of a portable terminal cover PC-3a according to another embodiment. The portable terminal cover PC-3a of FIG. 12 according to an embodiment is different from the portable terminal cover PC-3 of FIG. 11 in that the portable terminal cover PC-3a further include a connection part EP. That is, the portable terminal cover PC-3a according to an embodiment may further include the connection part EP between the adjacent side surfaces SP1, SP2, SP3, and SP4 of the plurality of side surfaces SP1, SP2, SP3, and SP4. The connection part EP may be a portion that covers the corner part CDP (see FIG. 1) of the portable terminal MD (see FIG. 1).

The connection part EP may be disposed between the adjacent side surfaces SP1, SP2, SP3, and SP4 and bent from the rear surface RP in the direction of the third directional axis DR3. The plurality of side surface SP1, SP2, SP3, and SP4, the rear surface RP, and the connection part EP may have an integrated shape. The front surface FP may be connected to one side surface of the plurality of side surfaces SP1, SP2, SP3, and SP4 and also connected to a portion of the connection part EP that is adjacent to the one side surface.

Although the front surface FP is connected to the second side surface SP2 and a portion of the connection part EP connected to the second side surface SP2 in FIG. 12, an embodiment of the inventive concept is not limited thereto.

The portable terminal cover PC-3a of FIG. 12 according to an embodiment may include first to fourth side surfaces SP1, SP2, SP3, and SP4, a rear surface RP connected to the first to fourth side surfaces SP1, SP2, SP3, and SP4, and an insertion space OS4 defined as a connection part EP disposed between the side surfaces SP1, SP2, SP3, and SP4. The portable terminal MD (see FIG. 1) may be seated in the insertion space OS4.

In the portable terminal cover PC-3a according to an embodiment, all of the plurality of side surfaces SP1, SP2, SP3, and SP4 may be transparent, and the connection part EP disposed between the side surfaces SP1, SP2, SP3, and SP4, which are adjacent to each other, may be opaque. The opaque connection part EP may be made of a material that is different from each of the plurality of transparent side surfaces SP1, SP2, SP3, and SP4. The rear surface RP may be opaque, and the opaque rear surface RP and the opaque connection part EP may be made of the same material. Also, the opaque rear surface RP and the opaque connection part EP may be made of materials different from each other. Here, the connection part EP may be made of a material having elasticity greater than that of the rear surface RP.

In the portable terminal cover PC-3a of FIG. 12 according to an embodiment, the front surface FP may include an auxiliary display window WP. The auxiliary display window WP may pass through a portion of the front surface FP. For example, the front surface FP may be opaque, and the auxiliary display window WP may be opened to expose a portion of the top surface display part TDP (see FIG. 1) of the seated portable terminal MD (see FIG. 1).

Also, in other embodiments, the auxiliary display window WP may be made of a transparent material. That is, the auxiliary display window WP may be a portion that is disposed in a portion of the opaque front surface FP and made of a transparent material. Although the auxiliary display window WP has a rectangular shape in FIG. 12, an embodiment of the inventive concept is not limited to the shape of the auxiliary display window WP. The auxiliary display window WP may have a circular shape, an oval shape, or a polygonal shape. The auxiliary display window WP may have a surface area greater than of the auxiliary display window WP illustrated in the drawing. Also, although the front surface FP is covered, an image provided on the top surface display part TDP (see FIG. 1) may be provided to the user in a larger surface area.

The portable terminal cover PC-3b of FIG. 13 according to an embodiment may include first to fourth side surfaces SP1, SP2-b, SP3, and SP4, a rear surface RP connected to the first to fourth side surfaces SP1, SP2-b, SP3, and SP4, and a front surface FP connected to one side surface of the first to fourth side surfaces SP1, SP2-b, SP3, and SP4. Although the portable terminal cover PC-3b of FIG. 13 according to an embodiment includes the connection part EP disposed between the adjacent side surfaces of the side surfaces SP1, SP2-b, SP3, and SP4, the connection part EP according to an embodiment may be omitted.

In FIG. 13, the front surface FP may be connected to the second side surface SP2-b. The second side surface SP2-b may have one side connected to the rear surface RP and the other surface connected to the front surface FP. In the portable terminal cover PC-3b of FIG. 13 according to an embodiment, each of the first side surface SP1 and the third and fourth side surfaces SP3 and SP4 may extend from the rear surface RP and be bent in the direction of the third directional axis DR3. However, the second side surface SP2-b may be bent in the direction of the third directional axis DR3, but be not fixed. Thus, the second side surface SP2-b may be integrated with the portion connected to the rear surface RP without being bent. That is, the front surface FP may be connected to the other side of the second side surface SP2-b on the whole. However, the front surface FP may not be connected to the connection part EP adjacent to the second side surface SP2-b.

FIG. 14B is a cross-sectional view taken along line VI-VI' of FIG. 13. The portable terminal cover PC-3b of FIG. 14B according to an embodiment is different from the portable terminal cover PC-3 of FIG. 14A according to an embodiment in that the second side surface SP2-b is not fixed, but bent in the direction of the third directional axis DR3 and thus be spread in a direction in which the front surface FP is spread.

In the portable terminal cover PC-3b of FIGS. 13 and 14B according to an embodiment, since the second side surface SP2-b has the same spread structure as the front surface FP, the front surface FP may be more easily opened and closed.

In the portable terminal cover PC-3a of FIGS. 11 and 14A according to an embodiment, the second side surface SP2 is bent in the direction of the third directional axis DR3 and fixed even though the front surface FP is opened, the portable terminal cover PC-3a may protect the portable terminal MD (see FIG. 1) and the second side surface display part SDP2 in the state in which the front surface FP is opened.

Figure 15A:
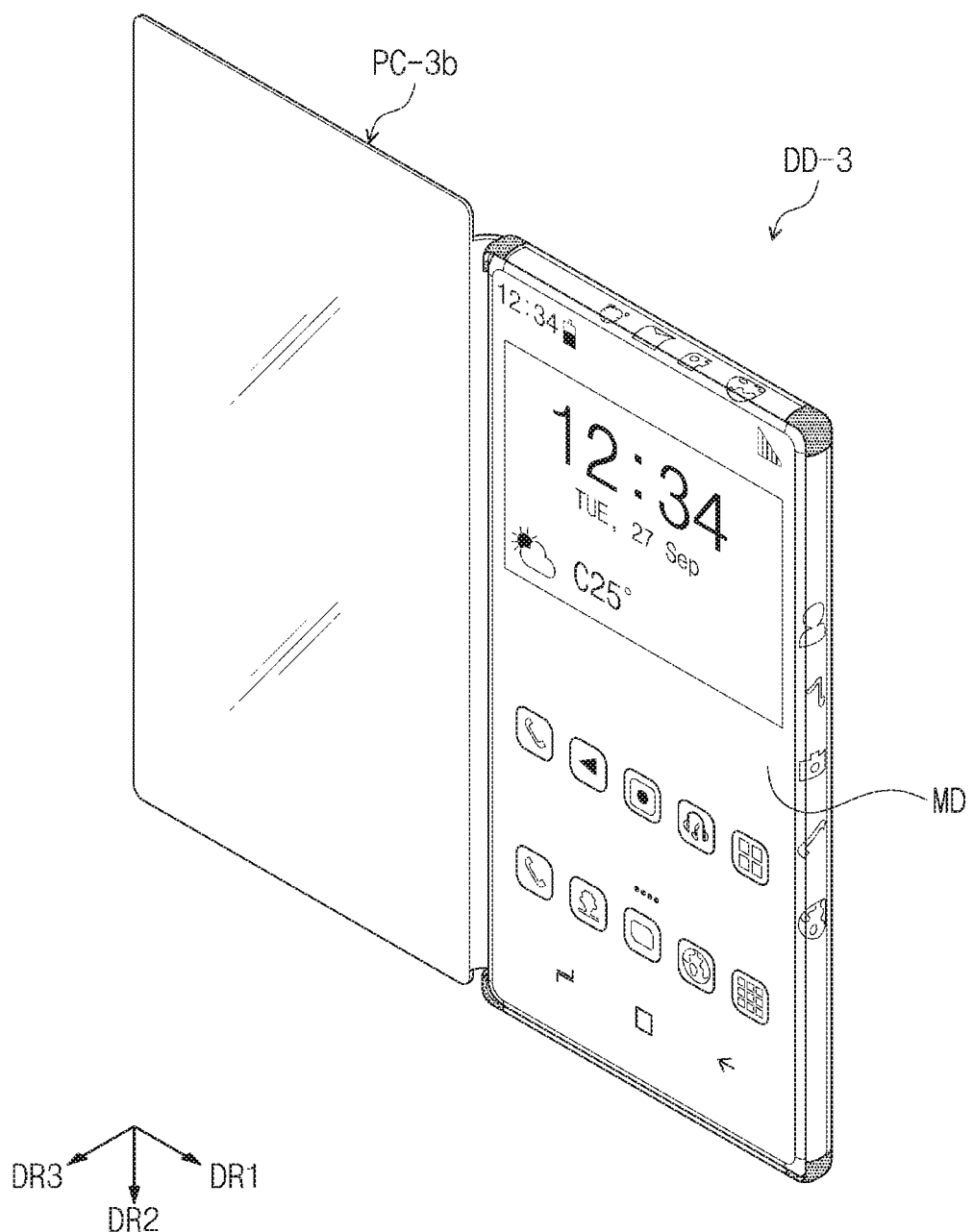
Figure 15B:
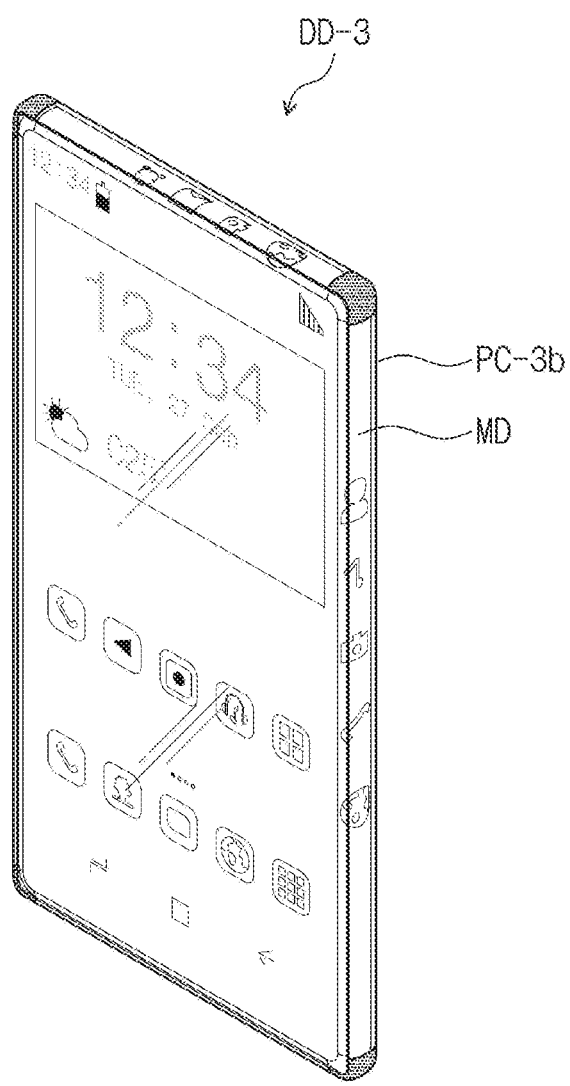

FIGS. 15A and 15B illustrate an example of an electronic device DD-3 including a portable terminal cover PC-3b of FIGS. 13 and 14B according to an embodiment. Referring to FIGS. 15A and 15B, a display device DD-3 according to an embodiment includes a portable terminal MD including the top surface display part TDP (see FIG. 1) and at least four side surface display parts SDP1, SDP2, SDP3, and SDP4 and a portable terminal cover PC-3b covering the portable terminal MD.

The side surfaces SP1, SP2, SP3, and SP4 of the portable terminal cover PC-3b may cover the side surface display parts SDP1, SDP2, SDP3, and SDP4, and the front surface FP of the portable terminal cover PC-3b may cover the top surface display part TDP. FIG. 15A illustrates a state in which the front surface FP is opened to expose the top surface display part TDP (see FIG. 1). FIG. 15B illustrates a case in which the front surface FP covers the top surface display part TDP (see FIG. 1). In the electronic device DD-3 of FIGS. 15A and 15B according to an embodiment, all of the side surfaces SP1, SP2, SP3, and SP4 of the portable terminal cover PC-3b may be transparent. Also, the front surface FP may be transparent. A rear surface RP and a connection part EP of the portable terminal cover PC-3b may be opaque.

Thus, in the electronic device DD-3 of FIGS. 15A and 15B according to an embodiment, the four side surface display parts may be provided to provide an image to a top surface and side surfaces. In addition, the portable terminal cover including the transparent side surfaces may be provided to protect the side surface display parts and also allow the user to recognize the image provided on the side surface display parts.

Although the front surface FP is transparent, and the rear surface RP is opaque in FIGS. 15A and 15B, an embodiment of the inventive concept is not limited thereto. For example, all of the front surface FP and the rear surface RP may be opaque, or all of the front surface FP and the rear surface RP may be transparent.

FIGS. 16A and 16B are views of a portable terminal cover PC-4 according to an embodiment. The portable terminal cover PC-4 according to an embodiment may include a plurality of transparent side surfaces SP1, SP2, SP3, and SP4, a rear surface FP connected to the plurality of side surfaces SP1, SP2, SP3, and SP4, and a front surface FP connected to one side surface of the plurality of side surfaces SP1, SP2, SP3, and SP4. The front surface FP of FIGS. 16A and 16B according to an embodiment may be connected to one side of the fourth side surface SP4.

FIG. 16B is a side view illustrating a state in which a portion of the front surface FP is opened in the portable terminal cover PC-4 of FIG. 16A according to an embodiment. Referring to FIG. 16B, when the front surface FP is completely opened, the front surface FP may be spread in a direction of a fifth directional axis DR5 parallel to the extending direction of the first side surface SP1.

Although the front surface FP is connected to the second side surface SP2 in FIGS. 11 to 13, and the front surface FP is connected to the fourth side surface SP4 in FIG. 16A, an embodiment of the inventive concept is not limited thereto. For example, the front surface FP according to an embodiment may be connected to the first side surface SP1 or the third side surface SP3.

FIG. 17 is a perspective view of a portable terminal cover PC-5 according to an embodiment. FIGS. 18A and 18B are perspective views of an electronic device DD-4 including the portable terminal cover PC-5 according to an embodiment. FIG. 18A is a perspective view illustrating a state in which a top surface of the electronic device DD-4 is mainly seen according to an embodiment, and FIG. 18B is a perspective view illustrating a state in which a bottom surface of the electronic device DD-4 is mainly seen according to an embodiment.

Referring to FIGS. 17 to 19B, the portable terminal cover PC-5 according to an embodiment may include a plurality of transparent side surfaces SP1, SP2, SP3, and SP4, a front surface FP connected to one side surface of the plurality of side surfaces SP1, SP2, SP3, and SP4, and a rear surface RP-5 connected to the plurality of side surfaces SP1, SP2, SP3, and SP4. Also, the portable terminal cover PC-5 according to an embodiment may further include a connection part EP-5 between the adjacent side surfaces of the plurality of side surfaces SP1, SP2, SP3, and SP4. The plurality of side surfaces SP1, SP2, SP3, and SP4 of the portable terminal cover PC-5 according to an embodiment may cover the side surface display parts SDP1, SDP2, SDP3, and SDP4 of the portable terminal, and the front surface FP may cover the top surface display part TDP. All of the front surface FP and the plurality of side surfaces SP1, SP2, SP3, and SP4 may be transparent.

Referring to FIG. 18A, in the portable terminal cover PC-5 according to an embodiment, the connection part EP-5 may include a light emitting device LP. Also, referring to FIG. 18B, in the portable terminal cover PC-5 according to an embodiment, the rear surface RP-5 may include rear light emitting devices BLP and BLP-L.

The light emitting device LP may emit light having a single color. For example, the light emitting device LP may emit light having a color senor similar to that of an image provided on each of the side surface display parts SDP1, SDP2, SDP3, and SDP4, which are adjacent to each other, to realize the unity of the image provided from the portable terminal MD. The light emitted from the light emitting device LP may be controlled by the portable terminal MD. In the electronic device DD-4 according to another embodiment, the light emitting device LP may be electrically connected to the portable terminal MD. That is, the light emitting device LP of the connection part EP-5 may be controlled by receiving a signal provided from the portable terminal MD.

The rear light emitting device BLP and BLP-L may be provided in the rear surface RP-5. The rear light emitting device BLP and BLP-L may emit light having a single color or light having colors different from each other. For example, the rear light emitting devices BLP and BLP-L may emit light having a color senor similar to that of an image provided on each of the side surface display parts SDP1, SDP2, SDP3, and SDP4, which are adjacent to each other, to realize the unity of the image provided from the portable terminal MD. Also, the rear light emitting devices BLP and BLP-L may be controlled to display symbols, characters, colors, and the like, which are preferred or selected by the user. In the electronic device DD-4 according to another embodiment, the rear light emitting devices BLP and BLP-L may be electrically connected to the portable terminal MD. That is, the rear light emitting devices BLP and BLP-L of the rear surface may be controlled by receiving a signal provided from the portable terminal MD.

Also, the light emitting device LP and the rear light emitting devices BLP and BLP-L may perform a function of the display part that provides an image. The light emitting device LP may be disposed in the portable terminal MD to provide an image connected to the image provided on each of the side surface display parts SDP1, SDP2, SDP3, and SDP4 and thereby to realize the unity of the image provided on the side surface display parts SDP1, SDP2, SDP3, and SDP4. The rear light emitting device BLP and BLP-L may perform a function of the display part that provides various images according to user's selection.

In the electronic device DD-4 according to an embodiment, the light emitting device LP and the rear light emitting devices BLP and BLP-L may further include a control unit that is electrically connected to the portable terminal MD and then controlled by the portable terminal MD to provide an image.

In the portable terminal cover PC-5 of FIGS. 17 to 18B and the electronic device DD-4 including the portable terminal cover PC-5 according to an embodiment, the light emitting device LP and the rear light emitting devices BLP and BLP-L provided in the portable terminal cover PC-5 may emit light or display an image on a corner part CDP and a bottom surface of the portable terminal, on which an image is not provided, to allow the electronic device DD-4 to perform various display functions.

In FIG. 18A, the light emitting device LP provided in the connection part EP-5 may realize the same color as that displayed on the side surface display parts SDP1 and SDP4 and the top surface display part TDP so that the image provided on the display device DD-4 has a sense of unity as the whole. In FIG. 18A, the images displayed on the light emitting devices LP of the top surface display part TDP, the side display parts, and the connection part EP-5 except for a main image MIM displayed on the top surface display part TDP may be controlled to have similar color senses to more practically display the main image MIM.

FIG. 18B is a schematic view illustrating the bottom surface of the electronic device DD-4. That is, FIG. 18B illustrates an example in which the rear light emitting device BLP and BLP-L are controlled to realize an image. In FIG. 18B, the "rear light emitting device BLP-L" of the rear light emitting devices BLP and BLP-L may be a device emitting light, and the "rear light emitting device BLP" may be a light emitting device that does not operate. Although the character "s" is displayed as an example in FIG. 18B, the electronic device DD-4 according to an embodiment may display various characters, symbols, images, and the like on the bottom surface by using the rear light emitting devices BLP and BLP-L.

The portable terminal cover according to an embodiment may include the transparent side surfaces to provide an image provided on the side surface display part to the user while protecting the side surface display parts of the portable terminal including the side surface display parts. Also, the electronic device according to an embodiment may include the at least four side surface display parts to display in various directions, thereby providing various information to the user. In addition, the electronic device may include the portable terminal cover including the transparent side surfaces that transmit the image provided on the side surface display parts to effectively protect the portable terminal.

The portable terminal cover according to the embodiment may include the transparent side surfaces to transmit the image provided on the side surface display parts of the portable terminal to the user in the state in which the cover is provided.

The electronic device according to the embodiment may include the portable terminal including the plurality of side surface display parts and the portable terminal cover including the transparent side surfaces covering the side surface display parts to provide the image in the various directions while protecting the portable terminal.

It will be apparent to those skilled in the art that various modifications and variations can be made in the inventive concept. Thus, it is intended that the present disclosure covers the modifications and variations of this invention provided they come within the scope of the appended claims and their equivalents.

Hence, the real protective scope of the inventive concept shall be determined by the technical scope of the accompanying claims.

What is claimed is:

1. A portable terminal cover consisting of:
a front surface;
four transparent side surfaces spaced apart from each other and extending from edges of the front surface, respectively; and
an insertion space defined by the front surface and the four transparent side surfaces,
wherein the front surface is configured to cover a top surface display part of a portable terminal through which images are displayed,
wherein the four transparent side surfaces are configured to cover four side surface display parts of the portable terminal through which images are displayed and extend from edges of the top surface display part, respectively,
wherein the portable terminal is configured to be inserted into the insertion space, and
wherein the front surface and the four transparent side surfaces are permanently affixed to each other not to move and formed in a single body using a same transparent material.

2. The portable terminal cover of claim 1, wherein a bottom surface of the portable terminal is opened to be exposed.

3. A portable terminal cover consisting of:
a front surface;
four transparent side surfaces spaced apart from each other and extending from edges of the front surface, respectively; and
an insertion space defined by the front surface and the four transparent side surfaces,
wherein the front surface covers a main display surface of a portable terminal configured to provide an image in a first direction,
wherein the four transparent side surfaces cover four sub display surfaces of the portable terminal configured to provide an image in a direction different from the first direction and extend from edges of the main display surface, respectively,
wherein the portable terminal is configured to be inserted into the insertion space, and
wherein the front surface and the four side surfaces are affixed to each other and formed in a single body using a same transparent material.

4. An electronic device comprising:
a portable terminal comprising a top surface display part through which images are displayed and four side surface display parts through which images are displayed and extending from edges of the top surface display part, respectively; and
a portable terminal cover;
wherein the portable terminal cover consisting of:
a front surface,
four transparent side surfaces spaced apart from each other and extending from edges of the front surface, respectively, and
an insertion space defined by the front surface and the four transparent side surfaces,
wherein the front surface covers the top surface display part and the four transparent side surfaces cover the four side surface display parts, respectively,
wherein the portable terminal is configured to be inserted into the insertion space, and
wherein the front surface and the four transparent side surfaces are affixed to each other and formed in a single body using a same transparent material.

5. The electronic device of claim 4, wherein a display surface of each of the four side surface display parts is not parallel to a display surface of the top surface display part.

* * * * *